United States Patent
Bala et al.

(10) Patent No.: US 10,410,380 B2
(45) Date of Patent: Sep. 10, 2019

(54) IMAGE RENDERING UTILIZING PROCEDURAL YARN MODEL GENERATED IN MULTI-STAGE PROCESSING PIPELINE

(71) Applicants: Cornell University, Ithaca, NY (US); The Regents of the University of California, Oakland, CA (US)

(72) Inventors: Kavita Bala, Ithaca, NY (US); Fujun Luan, Fushun (CN); Shuang Zhao, Irvine, CA (US)

(73) Assignees: Cornell University, Ithaca, NY (US); The Regents of the University of California, Oakland, CA (US)

( * ) Notice: Subject to any disclaimer, the term of this patent is extended or adjusted under 35 U.S.C. 154(b) by 143 days.

(21) Appl. No.: 15/636,213

(22) Filed: Jun. 28, 2017

(65) Prior Publication Data

US 2018/0005413 A1 Jan. 4, 2018

Related U.S. Application Data

(60) Provisional application No. 62/356,050, filed on Jun. 29, 2016.

(51) Int. Cl.
  *G06T 11/00* (2006.01)
  *G06K 9/62* (2006.01)
  (Continued)

(52) U.S. Cl.
  CPC .......... *G06T 11/003* (2013.01); *G06K 9/6267* (2013.01); *G06T 1/20* (2013.01);
  (Continued)

(58) Field of Classification Search
  None
  See application file for complete search history.

(56) References Cited

U.S. PATENT DOCUMENTS

2003/0071812 A1 4/2003 Guo et al.
2005/0115285 A1 6/2005 Xu et al.
(Continued)

FOREIGN PATENT DOCUMENTS

DE 19818069 A1 10/1999
EP 1452985 A1 9/2004
WO 9731262 A1 8/1997

OTHER PUBLICATIONS

V. Nelson et al., "Practical Offline Rendering of Woven Cloth," Proceedings of the Conference on Smart Tools and Applications in Computer Graphics (STAG), Oct. 3-4, 2016, 8 pages.
(Continued)

*Primary Examiner* — Idowu O Osifade
(74) *Attorney, Agent, or Firm* — Ryan, Mason & Lewis, LLP

(57) ABSTRACT

An apparatus in one embodiment comprises a multi-stage processing pipeline configured to generate a procedural yarn model by fitting procedural yarn model parameters to input data comprising computed tomography measurements of one or more actual yarn samples. The apparatus further comprises an image rendering system configured to execute one or more procedural yarn generation algorithms utilizing the procedural yarn model and to generate based at least in part on results of execution of the one or more procedural yarn generation algorithms at least one corresponding output image for presentation on a display. The multi-stage processing pipeline comprises a first stage configured to perform ply twisting estimation and ply cross-sectional estimation, a second stage configured to classify constituent fibers into regular fibers and flyaway fibers, and third and fourth stages configured to process the respective regular and flyaway fibers to fit respective different sets of parameters of the procedural yarn model.

35 Claims, 22 Drawing Sheets

(51) Int. Cl.
  *G06T 1/20*  (2006.01)
  *G06T 3/40*  (2006.01)
  *G06T 15/00* (2011.01)
(52) U.S. Cl.
  CPC .............. *G06T 3/40* (2013.01); *G06T 11/008* (2013.01); *G06T 15/00* (2013.01); *G06T 2210/16* (2013.01); *G06T 2210/52* (2013.01); *G06T 2211/40* (2013.01)

(56) References Cited

U.S. PATENT DOCUMENTS

| | | | |
|---|---|---|---|
| 2008/0170982 A1* | 7/2008 | Zhang .................... | B82Y 10/00 423/447.3 |
| 2009/0289940 A1 | 11/2009 | Kimura et al. | |
| 2010/0063789 A1 | 3/2010 | Imao et al. | |
| 2016/0110915 A1 | 4/2016 | Degenhard et al. | |

OTHER PUBLICATIONS

T. Zheng et al., "An Overview of Modeling Yarn's 3D Geometric Configuration," Journal of Textile Science and Technology, Feb. 6, 2015, pp. 12-24.
R. Yin et al., "Mathematical Modeling of Yarn Dynamics in a Generalized Twisting System," Scientific Reports, Apr. 15, 2016, 13 pages, Article No. 24432, vol. 6.
Github, "Nelder-Mead Simplex Method," http://www.mikehutt.com/neldermead.html, 2003, 2 pages.
Jules Bloomenthal, "Calculation of Reference Frames Along a Space Curve," Graphics Gems, 1990, pp. 567-571, vol. 1.
G. Cirio et al., "Yarn-Level Simulation of Woven Cloth," ACM Transactions on Graphics (TOG), Proceedings of ACM SIGGRAPH, Nov. 2014, 11 pages, Article No. 207, vol. 33, No. 6.
E. Heitz et al., "The SGGX Microflake Distribution," ACM Transactions on Graphics (TOG), Proceedings of ACM SIGGRAPH, Aug. 2015, 12 pages, Article No. 48, vol. 34, No. 4.
W. Jakob, "Mitsuba Physically-Based Renderer," http://www.mitsuba-renderer.org, 2015, 3 pages.
W. Jakob et al., "A Radiative Transfer Framework for Rendering Materials with Anisotropic Structure," ACM Transactions on Graphics (TOG), Proceedings of ACM SIGGRAPH, Jul. 2010, 13 pages, Article No. 53, vol. 29, No. 4.
W. Jakob et al., "Discrete Stochastic Microfacet Models," ACM Transactions on Graphics (TOG), Proceedings of ACM SIGGRAPH, Jul. 2014, 10 pages, Article No. 115, vol. 33, No. 4.
J.M. Kaldor et al., "Simulating Knitted Cloth at the Yarn Level," ACM Transactions on Graphics (TOG), Proceedings of ACM SIGGRAPH, Aug. 2008, 9 pages, Article No. 65, vol. 27, No. 3.
P. Khungurn et al., "Matching Real Fabrics with Micro-Appearance Models," ACM Transactions on Graphics (TOG), Dec. 2015, 26 pages, Article No. 1, vol. 35, No. 1.
Github, "Spline Library," https://github.com/ejmahler/SplineLibrary, 2017, 3 pages.
T. Müller et al., "Efficient Rendering of Heterogeneous Polydisperse Granular Media," ACM Transactions on Graphics (TOG), Proceedings of ACM SIGGRAPH, Nov. 2016, 14 pages, Article No. 168, vol. 35, No. 6.
J. Meng et al., "Multi-Scale Modeling and Rendering of Granular Materials," ACM Transactions on Graphics (TOG), Proceedings of ACM SIGGRAPH, Aug. 2015, 13 pages, Article No. 49, vol. 34, No. 4.
I. Sadeghi et al., "A Practical Microcylinder Appearance Model for Cloth Rendering," ACM Transactions on Graphics (TOG), Apr. 2013, 12 pages, Article No. 14, vol. 32, No. 2.
W. Wang et al., "Computation of Rotation Minimizing Frames," ACM Transactions on Graphics (TOG), Mar. 2008, 18 pages, Article No. 2, vol. 27, No. 1.
K. Wu et al., "Real-Time Fiber-Level Cloth Rendering," Proceedings of the 21st ACM SIGGRAPH Symposium on Interactive 3D Graphics and Games (I3D), Feb. 2017, 8 pages, Article No. 5.
C. Yuksel et al., "Stitch Meshes for Modeling Knitted Clothing with Yarn-Level Detail," ACM Transactions on Graphics (TOG), Proceedings of ACM SIGGRAPH, Jul. 2012, 12 pages, Article No. 37, vol. 31, No. 4.
S. Zhao et al., "Modular Flux Transfer: Efficient Rendering of High-Resolution Volumes with Repeated Structures," ACM Transactions on Graphics (TOG), Proceedings of ACM SIGGRAPH, Jul. 2013, 12 pages, Article No. 131, vol. 32, No. 4.
S. Zhao et al., "Building Volumetric Appearance Models of Fabric Using Micro CT Imaging," ACM Transactions on Graphics (TOG), Proceedings of ACM SIGGRAPH, Jul. 2011, 10 pages, Article No. 44, vol. 30, No. 4.
S. Zhao et al., "Structure-Aware Synthesis for Predictive Woven Fabric Appearance," ACM Transactions on Graphics (TOG), Proceedings of ACM SIGGRAPH, Jul. 2012, 10 pages, Article No. 75, vol. 31, No. 4.
S. Zhao et al., "Fitting Procedural Yarn Models for Realistic Cloth Rendering," ACM Transactions on Graphics (TOG), Proceedings of ACM SIGGRAPH, Jul. 2016, 11 pages, Article No. 51, vol. 35, No. 4.
A. Derouet-Jourdan et al., "Floating Tangents for Approximating Spatial Curves with G1 Piecewise Helices," Computer Aided Geometric Design, Jun. 2013, pp. 490-520, vol. 30, No. 5.
J.A. Nelder et al., "A Simplex Method for Function Minimization," The Computer Journal, Jan. 1965, pp. 308-313, vol. 7, No. 4.
Pointcarré, "Textile CAD Software," http://www.pointcarre.com/, 2016, 3 pages.
Y.-Q. Xu et al., "Photorealistic Rendering of Knitwear Using the Lumislice," Proceedings of the 28th Annual Conference on Computer Graphics and Interactive Techniques (SIGGRAPH), 2001, pp. 391-398.
P. Irawan et al., "Specular Reflection from Woven Cloth," ACM Transactions on Graphics (TOG), Jan. 2012, 20 pages, Article 11, vol. 31, No. 1.
F. Klok, "Two Moving Coordinate Frames for Sweeping Along a 3D Trajectory," Computer Aided Geometric Design, Nov. 1986, pp. 217-229, vol. 3, No. 3.
K. Shröder et al., "Image-Based Reverse Engineering and Visual Prototyping of Woven Cloth," IEEE Transactions on Visualization and Computer Graphics, Feb. 2015, pp. 188-200, vol. 21, No. 2.
E.R. Woodcock et al., "Techniques Used in the GEM Code for Monte Carlo Neutronics Calculations in Reactors and Other Systems of Complex Geometry," Proceedings of the Conference of Applications of Computing Methods to Reactor Problems, May 17-19, 1965, pp. 557-579.
M. Keefe, "Solid Modeling Applied to Fibrous Assemblies, Part I: Twisted Yarns," Journal of the Textile Institute, 1994, pp. 338-349, vol. 85, No. 3.
T. Shinohara et al., "Extraction of Yarn Positional Information from a Three-Dimensional CT Image of Textile Fabric Using Yarn Tracing with a Filament Model for Structure Analysis," Textile Research Journal, 2010, pp. 623-630, vol. 80, No. 7.
Xiaoming Tao, "Mechanical Properties of a Migrating Fiber," Textile Research Journal, Dec. 1, 1996, pp. 754-762, vol. 66, No. 12.
Y.-Q. Xu et al., "Photorealistic Rendering of Knitwear Using the Lumislice," Proceedings of the 28th Annual Conference on Computer Graphics and Interactive Techniques, 2001, pp. 391-398.
J. Voborova et al., "Yarn Properties Measurement: An Optical Approach," 2nd International Textile, Clothing & Design Conference—Magic World of Textiles, Oct. 3-6, 2004, pp. 1-6.
P.J. Morris et al., "Modelling of Yarn Properties from Fibre Properties," Journal of the Textile Institute, Fibre Science and Textile Technology, 1999, pp. 322-335, vol. 90, No. 3.

\* cited by examiner

Algorithm 1 procedural yarn generation

1: for each ply $i$ do
2:    generate regular fibers using Eq. (1), Eq. (2), Eq. (3)
3:    add flyaway fibers
4:    scale all fibers in the ply to obtain elliptical cross-sections
5: end for
6: twist all plies together around the yarn center

FIG. 3

Algorithm 2 Sampling cross-sectional fiber location

Require: cross-sectional fiber distribution parameters $\epsilon, \beta$

1: procedure SAMPLEFIBERLOCATION($\epsilon, \beta$)
2:    repeat
3:       draw $(x, y)$ uniformly in a unit disc
4:       draw $\xi$ from $U[0, 1]$
5:    until $\xi < p(\|(x, y)\|_2)$       $\triangleright$ $p$ defined in Eq. (1)
6:    return $(x, y)$
7: end procedure

FIG. 4

| Algorithm 3 |
|---|
| Input: Yarn curves $\alpha_1, \alpha_2, \ldots$; per-yarn procedural model parameters and fiber scattering profiles |
| Output: Whether a query point $p$ is inside a fiber; data block $b$ that contains volume density, albedo and orientation information |
| 1: function LOOKUP($p, b$) |
| 2:     $I \leftarrow$ LOOKUPYARN($p$) |
| 3:     for all $i \in I$ do |
| 4:        $p^{\text{yarn}} \leftarrow$ TRANSFORM($i, p$) |
| 5:        if LOOKUPREGULAR($i, p^{\text{yarn}}, b$) then |
| 6:           return true |
| 7:        end if |
| 8:        if LOOKUPFLYAWAY($i, p^{\text{yarn}}, b$) then |
| 9:           return true |
| 10:        end if |
| 11:     end for |
| 12:     return false |
| 13: end function |

FIG. 15

Algorithm 4 Regular fiber lookups.

1: function LOOKUPREGULAR($i, p^{yarn}, b$)
2:    $[x', y'] \leftarrow [x, y]M(z)$    ▷ Assuming $p_{ply} = [x, y, z]$
3:    Finding the bin $B_k$ containing $\theta' := \text{atan2}(y', x')$
4:    for all $\mathcal{T}_j$ associated with $B_k$ do
5:       Realize fiber $j$ on the fly
6:       if fiber $j$ covers $p^{yarn}$ then
7:          Store local material information (e.g., density) in $b$
8:          return true
9:       end if
10:   end for
11:   return false
12: end function

FIG. 18

Algorithm 5 Detecting all hair fibers active at $z$ (realization-free).

1: function ACTIVEFIBERS($z, I, \Omega$)
2:    $n \leftarrow |I|$
3:    if $n = 0$ or $\Omega \cap D(z) = \emptyset$ then
4:      return $\emptyset$
5:    else if $n = 1$ then                                                      ▷ Assuming $I = \{j\}$
6:      Draw $z_j$
7:      return $z_j \in D(z)$ ? $\{j\}$ : $\emptyset$
8:    else
9:      Subdivide $\Omega$ into four sub-domains $\Omega_1, \Omega_2, \Omega_3, \Omega_4$
10:     $p_k \leftarrow \mathbb{P}[z \in \Omega_k \mid z \in \Omega]$ for $k = 1, 2, 3, 4$
11:     Draw $(n_1, n_2, n_3, n_4)$ from multinomial distribution with $n$ trials and probabilities $(p_1, p_2, p_3, p_4)$
12:     Partition $I$ into $I_1, I_2, I_3, I_4$ according to $n_1, n_2, n_3, n_4$
13:     return $\cup_{k=1}^{4}$ ACTIVEFIBERS($z, I_k, \Omega_k$)
14:    end if
15: end function

FIG. 19

IMAGE RENDERING UTILIZING PROCEDURAL YARN MODEL GENERATED IN MULTI-STAGE PROCESSING PIPELINE

PRIORITY CLAIM

The present application claims priority to U.S. Provisional Patent Application Ser. No. 62/356,050, filed Jun. 29, 2016 and entitled "Fitting Procedural Yarn Models for Realistic Cloth Rendering," which is incorporated by reference herein in its entirety.

STATEMENT OF GOVERNMENT SUPPORT

This invention was made with government support provided by the National Science Foundation under U.S. Pat. No. 1,513,967 and CHS 1617861. The government has certain rights in the invention.

FIELD

The field relates generally to image processing, and more particularly to model-based generation of images.

BACKGROUND

Model-based cloth rendering is important for many applications such as online retail, textile design, and in entertainment applications like video games and movies. Despite a rich history in computer graphics, accurately modeling fabrics remains challenging in that fabrics are structurally and optically very complex, resulting in dramatic variations in their appearance under different conditions. Conventional fiber-based models based on micro-appearance modeling techniques capture the rich visual appearance of fabrics, but are too onerous to design and edit. Conventional yarn-based procedural models are powerful and convenient, but too regular and not realistic enough in appearance, as they lack fiber-level details that contribute significantly to overall appearance of a fabric.

SUMMARY

Illustrative embodiments of the invention provide an automatic fitting approach to create high-quality procedural yarn models of fabrics with fiber-level details. In some embodiments, this involves fitting computed tomography (CT) data to procedural models to automatically recover a full range of model parameters, including parameters for measurement-based modeling of flyaway fibers.

For example, in one embodiment, an automated modeling process is provided which takes physical CT measurements and computes procedural descriptions for fabric yarns. The output can be used to populate realistic fiber-level details into yarn-based models, significantly improving the realism of the final rendered image output. Further, the parameterized models are easy to edit, producing significant variations of appearance that match the real-world behavior of yarns. Such an embodiment advantageously bridges the gap between convenience and easy modeling on the one hand, and complex appearance on the other, thereby facilitating the generation of richly-detailed fabric models.

An apparatus in one embodiment comprises a multi-stage processing pipeline configured to generate a procedural yarn model by fitting procedural yarn model parameters to input data comprising computed tomography measurements of one or more actual yarn samples. The apparatus further comprises an image rendering system configured to execute one or more procedural yarn generation algorithms utilizing the procedural yarn model and to generate based at least in part on results of execution of the one or more procedural yarn generation algorithms at least one corresponding output image for presentation on a display. The multi-stage processing pipeline comprises a first stage configured to perform ply twisting estimation and ply cross-sectional estimation on at least a portion of the input data corresponding to a given yarn sample having multiple twisted plies with each such ply comprising multiple fibers, a second stage configured to classify constituent fibers of each of the plies into regular fibers and flyaway fibers, and third and fourth stages configured to process the respective regular and flyaway fibers. The third and fourth stages fit different sets of parameters of the procedural yarn model using the respective regular and flyaway fibers.

As indicated above, procedural models generated using illustrative embodiments advantageously bridge the gap between fiber-based models and yarn-based procedural models in that they can be used to populate fiber-level structure in the yarn models, significantly improving the virtual realism of rendered cloth appearance. Fitted results have been validated as exhibiting high quality by comparison with CT measurements as well as photographs.

Other illustrative embodiments provide realization-minimizing procedural yarn rendering techniques that enable physically based rendering of procedural textiles, without the need for full model realizations. Such techniques provide new data structures and search algorithms that look up regular and flyaway fibers on the fly, efficiently and consistently. The techniques work with compact fiber-level procedural yarn models in their exact form with no approximation imposed. In practice, illustrative embodiments implementing such techniques can render very large models that are practically unrenderable using existing methods, while using considerably less memory and achieving good performance.

These and other embodiments of the invention include but are not limited to systems, methods, apparatus, processing devices, integrated circuits, and processor-readable storage media having software program code embodied therein.

BRIEF DESCRIPTION OF THE FIGURES

FIG. 3 shows pseudocode of an algorithm for procedural yarn generation in an illustrative embodiment.

FIG. 4 shows pseudocode of an algorithm for sampling cross-sectional fiber location in an illustrative embodiment.

FIG. 15 shows pseudocode of an algorithm for realization-minimizing procedural yarn model lookups in an illustrative embodiment.

FIG. 18 shows pseudocode of an algorithm for regular fiber lookups in an illustrative embodiment.

FIG. 19 shows pseudocode of an algorithm for detecting hair-type fibers in an illustrative embodiment.

DETAILED DESCRIPTION

Embodiments of the invention can be implemented, for example, in the form of information processing systems comprising one or more processing platforms each having at least one computer, server or other processing device. Illustrative embodiments of such systems will be described in detail herein. It should be understood, however, that embodiments of the invention are more generally applicable to a wide variety of other types of information processing systems and associated computers, servers or other processing devices or other components. Accordingly, the term "information processing system" as used herein is intended to be broadly construed so as to encompass these and other arrangements.

Figure 1:
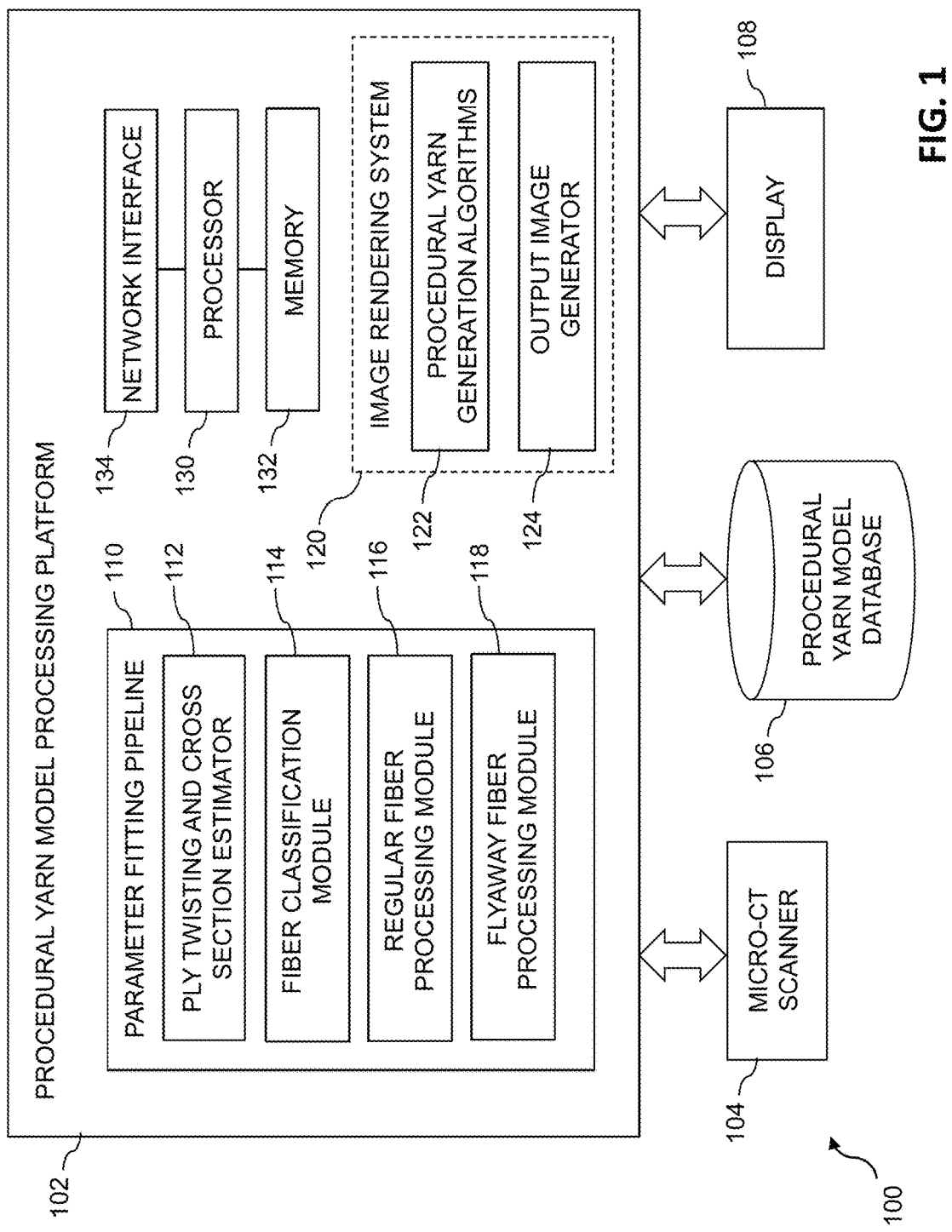
FIG. 1 is a block diagram of an information processing system that incorporates functionality for fitting of procedural yarn models and rendering of procedural yarn images in an illustrative embodiment.

FIG. 1 shows an information processing system 100 implementing functionality for fitting of procedural yarn models and rendering of procedural yarn images in an illustrative embodiment. The system 100 comprises a procedural yarn model processing platform 102, a micro-CT scanner 104, a procedural yarn model database 106 and a display 108.

The platform 102 comprises a parameter fitting pipeline 110. The parameter fitting pipeline 110 is an example of what is more generally referred to herein as a "multi-stage processing pipeline" and is configured to generate a procedural yarn model by fitting procedural yarn model parameters to input data from the micro-CT scanner 104.

The input data in the present embodiment illustratively comprises computed tomography measurements of one or more actual yarn samples. For example, the input data may comprise volumetric density information generated by the micro-CT scanner 104 for each of multiple scanned yarn samples. An example of a micro-CT scanner that may be used in a given embodiment is an XRadia MicroXCT scanner operating at a resolution of 2.5 µm. It is to be appreciated, however, that other types of computed tomography measurements from other data sources can be used in other embodiments. Also, alternative embodiments can be configured to utilize yarn measurements other than computed tomography measurements.

The parameter fitting pipeline 110 comprises a ply twisting and cross-section estimator 112, a fiber classification module 114, a regular fiber processing module 116 and a flyaway fiber processing module 118. These modules are associated with respective first, second, third and fourth stages of the parameter fitting pipeline 110.

The first stage implemented by module 112 is illustratively configured to perform ply twisting estimation and ply cross-sectional estimation on at least a portion of the input data corresponding to a given yarn sample having multiple twisted plies with each such ply comprising multiple fibers.

Figure 2:
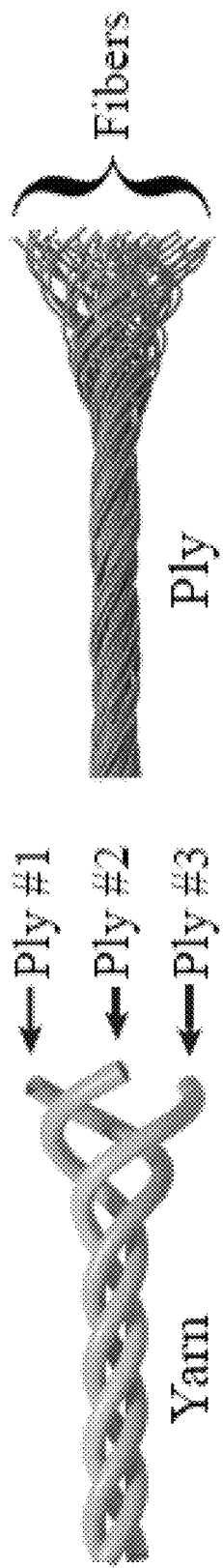
FIG. 2 shows an example of fabric structure including a multi-ply yarn in an illustrative embodiment.

One possible example of a fabric structure including a multi-ply yarn of this type is shown in FIG. 2. The multi-ply yarn in this example comprises three sub-strands called plies. Each ply in turn contains tens to hundreds of micron-diameter fibers. Numerous other fabric structures can be used in other embodiments.

It should be noted that the term "yarn" as used herein is intended to be broadly construed so as to encompass both single-ply and multi-ply configurations. Individual single-ply and/or multi-ply yarns are combined to form cloth, fabrics or other types of textiles. A given "textile" as the term is broadly used herein is intended to encompass cloth, fabric or other materials formed using multiple yarns of potentially different types.

The second stage implemented by module 114 is configured to classify constituent fibers of each of the plies into regular fibers and flyaway fibers. Yarns normally contain flyaway fibers which deviate from most other fibers, and can cause great irregularity in a yarn's micro-geometry. Although there are typically many fewer flyaway fibers than regular fibers, the flyaway fibers contribute significantly to a fabric's fuzziness. Thus, to accurately reproduce the appearance and structure of real-world fabrics, these flyaway fibers need to be properly modeled.

The third and fourth stages implemented by respective modules 116 and 118 are configured to process regular fibers and flyaway fibers, respectively. More particularly, the third and fourth stages fit different sets of parameters of the procedural yarn model using the respective regular and flyaway fibers.

The term "stage" as used herein in conjunction with a given parameter fitting pipeline is intended to be broadly construed so as to encompass a module, circuitry or other designated portion of a processing device. Multiple stages of a given parameter fitting pipeline as disclosed herein can be configured to operate at least in part in parallel with one another. For example, at least the third and fourth stages of the parameter fitting pipeline 110 may be configured to operate at least in part in parallel with one another.

The platform 102 further comprises an image rendering system 120. The image rendering system 120 is configured to execute one or more procedural yarn generation algorithms 122 utilizing one or more procedural yarn models generated by parameter fitting pipeline 110.

An example of a procedural yarn generation algorithm that may be executed by the image rendering system 120 is Algorithm 1 shown in FIG. 3. For each ply, Algorithm 1 generates regular fibers using Eq. (1), (2) and (3) below, adds flyaway fibers, and then scales all fibers in the ply to obtain elliptical cross-sections. The resulting plies are then twisted together around the yarn center to form the yarn.

Other examples of procedural yarn generation algorithms that may be executed by the image rendering system 120 include realization-minimizing algorithms exhibiting improved efficiency relative to Algorithm 1, and will be described below in conjunction with FIGS. 12 through 21.

Based at least in part on results of execution of the one or more procedural yarn generation algorithms, the image rendering system 120 generates at least one corresponding output image for presentation on display 108. This operation is performed by output image generator 124 which may comprise one or more graphics processor integrated circuits or other types and arrangements of image generation circuitry. In some embodiments, rendered images may be created in the image rendering system 120 at least in part utilizing a Mitsuba physically based renderer, although other types of renderers can be used.

Although the parameter fitting pipeline 110 and the image rendering system 120 are both shown as being implemented on platform 102 in the present embodiment, this is by way of illustrative example only. In other embodiments, the parameter fitting pipeline 110 and the image rendering system 120 can each be implemented on a separate processing platform. A given such processing platform is assumed to include at least one processing device comprising a processor coupled to a memory. Examples of such processing devices include computers, servers or other processing devices arranged to communicate over a network. Storage devices such as storage arrays or cloud-based storage systems used for implementation of procedural yarn model database 106 are also considered "processing devices" as that term is broadly used herein.

It is also possible that at least portions of one or more other system elements such as the micro-CT scanner 104, the procedural yarn model database 106 and the display 108 can in be implemented as part of the platform 102, although shown as being separate from the platform 102 in the figure.

The parameter fitting pipeline 110 of the platform 102 is advantageously configured to generate procedural yarn models automatically based on physical measurements of real-world yarns. For example, the parameter fitting pipeline can automatically build a procedural yarn model from physical measurements acquired using micro-CT imaging performed by the micro-CT scanner 104. Such an embodiment can be configured to utilize an improved flyaway fiber model which is not only statistically more meaningful, but also easier to fit to. The flyaway fiber model and other aspects of procedural yarn models generated using the parameter fitting pipeline 110 will be described in greater detail below.

The platform 102 can be configured for accessibility to one or more user devices over at least one network. For example, images generated by the platform 102 can be transmitted over a network to user devices such as, for example, a laptop computer, tablet computer or desktop personal computer, a mobile telephone, or another type of computer or communication device, as well as combinations of multiple such devices. The platform 102 can also receive input data from the micro-CT scanner 104 or other data sources over at least one network. Procedural models generated by the parameter fitting pipeline 110 can be delivered to the procedural yarn model database 106 over at least one network. The image rendering system 120 can retrieve a particular such procedural yarn model or set of models from the procedural yarn model database 106 for use in rendering images for presentation on the display 108.

The one or more networks mentioned above for supporting communications between elements of the system 100 are not explicitly shown in the figure but can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The platform 102 in the present embodiment further comprises a processor 130, a memory 132 and a network interface 134. The processor 130 is assumed to be operatively coupled to the memory 132 and to the network interface 134 as illustrated by the interconnections shown in the figure.

The processor 130 may comprise, for example, a microprocessor, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of processing circuitry, in any combination.

The memory 132 stores software program code for execution by the processor 130 in implementing portions of the functionality of the processing device. For example, at least portions of the functionality of parameter fitting pipeline 110 and the image rendering system 120 can be implemented using program code stored in memory 132.

A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, read-only memory (ROM), magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with one or both of the parameter fitting pipeline 110 and the image rendering system 120 as well as other related functionality.

The network interface 134 is configured to allow the platform 102 to communicate over one or more networks with other system elements, and may comprise one or more conventional transceivers.

It is be appreciated that the particular arrangement of components and other system elements shown in FIG. 1 is presented by way of illustrative example only, and numerous alternative embodiments are possible. For example, other embodiments of information processing systems can be configured to provide procedural yarn model processing functionality of the type disclosed herein.

Additional details regarding the operation of the system 100 will be described herein with reference to FIGS. 4 through 21.

Some embodiments utilize a procedural yarn model that is based in part on a model described in K. Schröder et al., "Image-based reverse engineering and visual prototyping of woven cloth," IEEE Transactions on Visualization and Computer Graphics, 21(2), pp. 188-200, 2015, which is incorporated by reference herein. This procedural yarn model and others described herein are presented by way of example only, and a wide variety of alternative models can be used in other embodiments.

The procedural yarn model statistically describes how individual yarns are formed by underlying fibers. The key parameters for fibers include cross-sectional fiber distribution, fiber twisting, and fiber migration, and the key parameters for plies include ply cross-section, ply twisting, and per-ply fiber count. We significantly improve this model by modifying the manner in which the model handles flyaway fibers, as will be described in more detail below. Accordingly, the procedural yarn model in these embodiments includes improved flyaway fiber distribution parameters.

The cross-sectional fiber distribution captures the likelihood of a fiber's existence given its distance $R \in [0,1)$ from the ply center. This distribution uses the following example density function:

$$p(R)=(1-2\epsilon)(e-e^R/e-1)^\beta+\epsilon, \quad (1)$$

which is used with rejection sampling to draw cross-sectional fiber locations. The density function in this model is unnormalized, but other types of density functions can be used in other embodiments.

Algorithm 2 in FIG. 4 is one example of an algorithm configured to perform rejection sampling using Eq. (1) above in drawing cross-sectional fiber locations.

Given a sampled location for the i-th fiber $(x_i, y_i)$, the fiber curve (as a circular helix parameterized by $\theta$) can be generated as follows, assuming the ply center to be the Z-axis:

$$x(\theta)=R_i \cos(\theta+\theta_i), y(\theta)=R_i \sin(\theta+\theta_i), z(\theta)=\alpha\theta/2\pi, \quad (2)$$

where $R_i:=\|(x_i, y_i)\|_2$, $\theta_i:=\text{a tan }2(y_i, x_i)$, and $\alpha$ is a constant determining the fiber's twist (i.e., the helix's pitch).

In Eq. (2) above, the distance between a generated fiber and the ply center stays constant. But this is unnatural: fibers typically migrate from such a fixed distance. This fiber migration is modeled by allowing the distance to change continuously between two given constants $R_{min}$ and $R_{max}$. That is, by replacing $R_i$ in Eq. (2) with:

$$R_i(\theta):=R_{min}R_i+(R_{max}-R_{min})R_i/2[\cos(s\theta+\theta_i^{(0)})+1], \quad (3)$$

where $s$ is a constant controlling the length of a rotation, and $\theta_i^{(0)}$ is a per-fiber parameter indicating the rotation's initial "phase".

Plies generated with Eq. (1) and Eq. (3) always have circular cross-sections. A simple generalization is to support elliptical cross-sections by scaling a ply along the X- and Y-directions by factors of $e_X$ and $e_Y$ respectively.

Real yarns usually contain flyaway fibers that do not follow the flow of normal fibers. These irregularities not only contribute greatly to the realism of yarn appearance, but are also crucial for reproducing fuzzy silhouettes of real-world fabrics. Previous work described in the above-cited Schröder et al. reference generated flyaway fibers in a somewhat simplified manner using 3D Perlin noise. We introduce an improved flyaway model which is statistically more meaningful and easier to fit to.

The final step to build a procedural yarn model in the present embodiment is twisting the component plies. For a yarn centered at the Z-axis, each ply is twisted to follow a circularly helical curve $$S(z):=(S_x(z), S_y(z), z)$$

with its pitch controlled by $\alpha^{ply}$:

$$S_x(z)=R^{ply}\cos(2\pi z/\alpha^{ply}+\theta^{ply}),$$

$$S_y(z)=R^{ply}\sin(2\pi z/\alpha^{ply}+\theta^{ply}). \quad (4)$$

Besides the cross-section and twisting information, each ply has an integer m associated with it that specifies the number of component fibers. The entire pipeline for procedural generation of yarn geometry using the above-described procedural yarn model is summarized in Algorithm 1 of FIG. 3.

Although the fiber generation process in Algorithm 1 is straightforward given the model parameters, its inverse problem of parameter fitting is far from trivial. Many fiber-level parameters, such as cross-sectional fiber distribution and fiber migration, are based on the statistical properties of a yarn's micro-geometry. These properties are difficult to acquire due to their small scale, and challenging to fit to because of their naturally existing irregularities.

In the system 100 of FIG. 1, we address these challenges by acquiring a yarn's micro-geometry using micro-CT imaging performed by micro-CT scanner 104, and by configuring parameter fitting pipeline 110 to automatically and robustly fit procedural representations to the measured data. In addition, we configure the flyaway fiber processing module 118 of the parameter fitting pipeline to utilize an improved model for capturing flyaway fibers which contributes significantly to photorealism.

Figure 5:
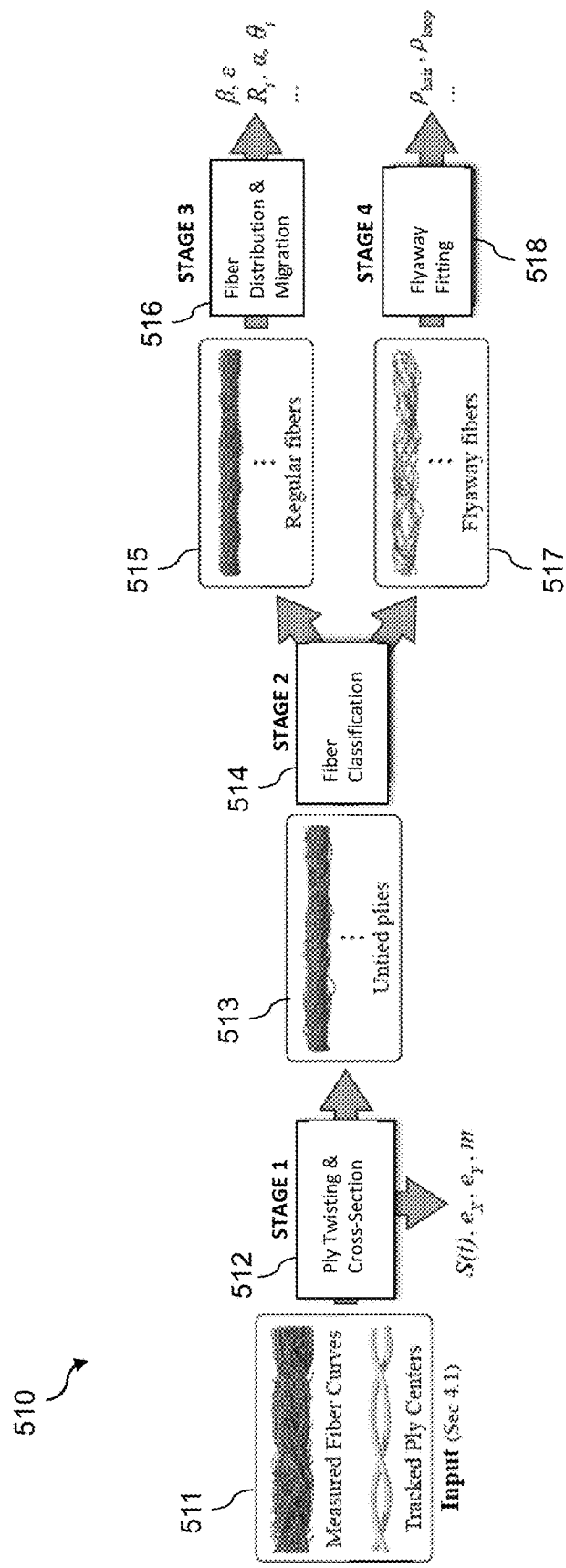
FIG. 5 illustrates a multi-stage parameter fitting pipeline in one embodiment.

FIG. 5 shows a more detailed example of an end-to-end pipeline 510 for fitting procedural yarns to physical measurements of micro-geometries. The pipeline 510 may be viewed as a more detailed example of the parameter fitting pipeline 110 of system 100. The procedural yarn model parameters to be fit by the pipeline 510 are summarized in Table 1 below.

TABLE 1

List of example parameters of a procedural yarn model.

| Parameter Type | Parameter Name | Defined | Fitted |
|---|---|---|---|
| Cross-Sectional Fiber Distribution | $\beta, \epsilon$ | Eq. (1) | Stage 3 |
| Fiber Twisting | $\alpha$ $R_i, \theta_i$ | Eq. (2) | Stage 3 |
| Fiber Migration | $R_{min}, R_{max}, s$ $\theta_i^{(0)}$ | Eq. (3) | Stage 3 |
| Ply Cross-Section | $e_X, e_Y$ | Above | Stage 1 |
| Ply Twisting | $R^{ply}, \alpha^{ply}$ | Eq. (4) | Stage 1 |
| Per-ply Fiber Count | m | Above | Stage 1 |
| Improved Flyaway Fiber Distribution | $\rho^{loop}, \rho^{hair}, R_{max}^{loop}$, $R_{min}^{hair}, R_{span}^{hair}$, $Z_{min}^{hair}$, $Z_{span}^{hair}, \theta_{min}^{hair}, \theta_{span}^{hair}$ | Eq. (11) | Stage 4 |

The procedural yarn model parameters of Table 1 include per-ply attributes as well as other parameters that are specified for every fiber by independently sampling the corresponding statistical distributions. In particular, certain per-fiber parameters of the improved flyaway fiber model (i.e., $R_{max}^{loop}$, $R_{min}^{hair}$, $R_{span}^{hair}$, and $\theta_{span}^{hair}$) are sampled by normal distributions while other per-fly parameters (i.e., $R_i$, $\theta_i$, and $\theta_i^{(0)}$) are drawn uniformly.

One challenge in the illustrative embodiments is converting volumetric CT data with no synthetic information to a procedural yarn model with correct ply-level and fiber-level properties. Many parameters must be identified properly to match the appearance of physical yarns. Ultimately this approach yields a compact and editable representation capturing the rich irregularities of real-world yarns.

The pipeline 510 at a high level is analogous to executing the procedural yarn generation process of Algorithm 1 in reverse order. More specifically, the pipeline 510 operates in approximately the opposite order of Algorithm 1 since the pipeline 510 is fitting model parameters to measured data rather than rendering a procedural yarn from a procedural yarn model. The pipeline 510 in this embodiment includes multiple stages 512, 514, 516 and 518, also denoted as Stage 1, Stage 2, Stage 3 and Stage 4, respectively. Other embodiments can include different numbers, types and arrangements of pipeline stages.

Stage 1 receives input data 511 in the form of measured yarn micro-geometry supplied by micro-CT scanner 104. The input data for a given yarn sample in this embodiment is preprocessed prior to application to the pipeline 510 in order to generate extracted fiber curves and a plurality of tracked ply centers. Stage 1 estimates ply twisting as well as the component plies' cross-sectional shapes. Using this information, we "untie" and deform all component plies so that they are centered on the Z-axis and have circular cross-sections. The output of Stage 1 includes untied plies 513.

Stage 2 receives the untied plies 513 from Stage 1. It analyzes each untied ply and classifies the constituent fibers into two categories: flyaway fibers and regular fibers. The output of Stage 2 includes regular fibers 515 and flyaway fibers 517.

Stage 3 receives the regular fibers 515 from Stage 2. It fits the cross-sectional fiber distribution and fiber migration parameters using the regular fibers.

Stage 4 receives the flyaway fibers 517 from Stage 2. It fits the flyaway fiber distribution parameters of the improved flyaway fiber model using the flyaway fibers.

Each of these stages of the parameter fitting pipeline 510 will be described in more detail below. Again, other parameter fitting pipelines having different numbers, types and arrangements of stages can be used in other embodiments.

As mentioned previously, Stage 1 utilizes input data obtained by acquiring micro-geometries of physical yarns using micro-CT imaging. Multiple yarns may be packed together for faster acquisition since they can be scanned simultaneously by the micro-CT scanner 104. Given micro-CT measurements with volumetric fiber densities, we process them to extract fiber curves. In addition, we perform yarn tracking to extract the center curve for each component ply. The recovered fiber curves and ply centers serve as input data 511 to the parameter fitting pipeline 510.

Stage 1 of the pipeline 510 is configured to recover the input yarn's plying (i.e., ply twisting and cross-sectional shape) so that we can separate individual plies and perform later per-ply analysis. In this embodiment, we assume all plies in a yarn are identical and evenly distributed around the yarn center. These and other assumptions made in the context of describing illustrative embodiments need not apply in other embodiments.

With regard to ply twisting, for each given ply center i (represented as a poly-line), we fit a helical curve $S_i$ in the form of Eq. (4) which involves estimating the ply radius $R_i^{ply}$, the pitch $\alpha_i^{ply}$, and initial angle $\theta_i^{ply}$. Given an assumption of identical and evenly distributed plies, this reduces to finding one set of $R^{ply}$ and $\alpha^{ply}$ shared by all piles; and $\theta_1^{ply}$, the initial angle of the first ply, which can be used to determine those of all other plies by setting $$\theta_i^{ply} = \theta_1^{ply} + 2\pi \frac{i-1}{K}.$$

To determine these parameters, we optimize the L2 distance between the given and fitted ply centers by minimizing:

$$E^{ply}(R^{ply}, \alpha^{ply}, \theta_1^{ply}) := \sum_{i=1}^{K} \int_{z_0}^{z_1} \left\| S_i(z \mid R^{ply}, \alpha^{ply}, \theta_1^{ply}) - S_i^{tracked}(z) \right\|_2^2 dz, \quad (5)$$

where K is the number of plies, $S_i$ is given by Eq. (4), and $S_i^{tracked}$ is the i-th input ply center whose two endpoints give $z_0$ and $z_1$.

To minimize Eq. (5), we use an open source implementation of the Nelder-Mead Simplex Method. One could also leverage more advanced optimization methods such as the floating tangent algorithm described in A. Derouet-Jourdan et al., "Floating tangents for approximating spatial curves with G1 piecewise helices," Computer Aided Geometric Design, 30(5), pp. 490-520, 2013, which is incorporated by reference herein, possibly leading to better accuracy and performance. However, by configuring the acquisition setup to keep yarn samples straight, the input curves (i.e., $S_i^{tracked}$) are already close to circular helices. We found that this simple approach was fast, well-behaved (i.e., there were no convergence issues), and produced high-quality results for rendering purposes.

Figure 6A:
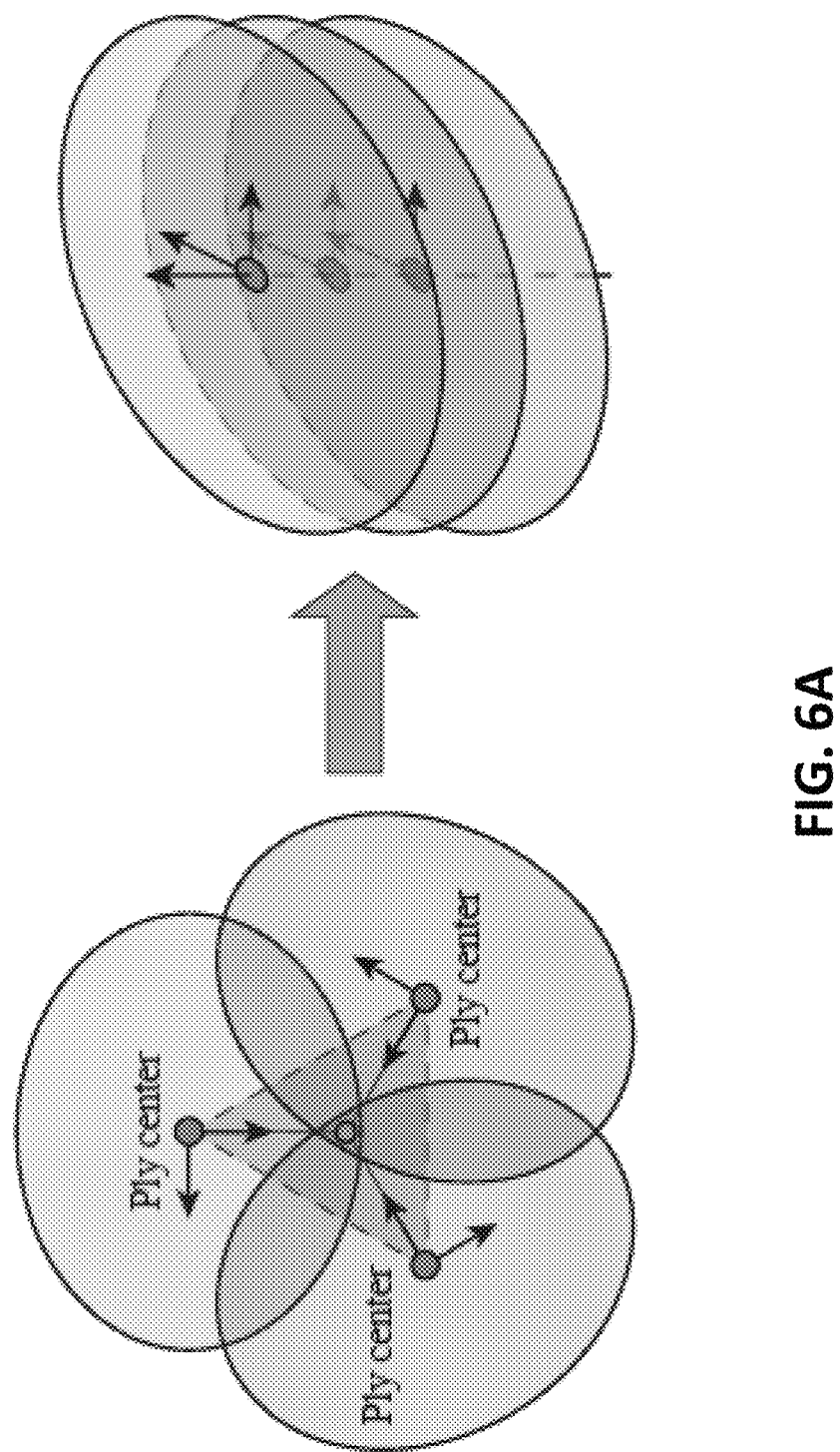
FIGS. 6A and 6B are diagrams that illustrate the fitting of ply cross-sections in one embodiment.

With regard to cross-section estimation, as in the above-cited Schröder et al. reference, we model the cross-sections of the plies as ellipses that are allowed to intersect, to mimic ply compression. Given a cross-sectional plane, we place an ellipse at the center of each ply with its short axis pointing towards the center of a polygon formed by all the ply centers, as illustrated in FIG. 6A for a three-ply example. As shown at the left side of FIG. 6A, the short axis of a given such ellipse points toward the center of a polygon (shown dashed boundaries) formed by all ply centers. The ellipses are used to determine the lengths of the ellipse axes (i.e., $e_X$ and $e_Y$). We assume identical plies, and therefore obtain one set of $e_X$ and $e_Y$ values based on information from all plies. In particular, we rotate and translate each ply (with all its constituent fiber centers) in the plane, making it axis-aligned and centered at the origin, as shown at the right side of FIG. 6A.

Figure 6B:
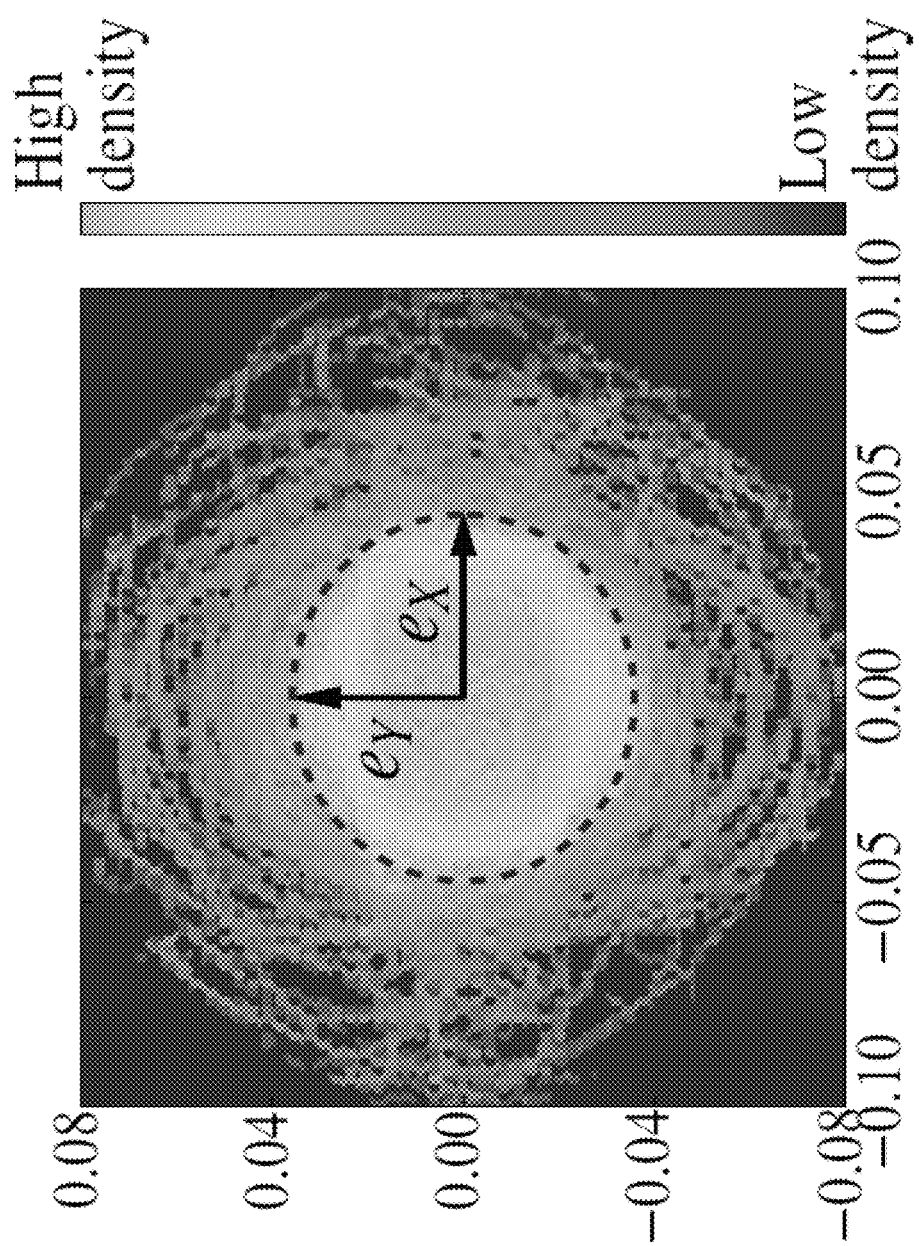

The resulting transformed 2D fiber locations will then be used to fit the ply cross-sections as illustrated in FIG. 6B. More particularly, all transformed plies from all cross-sectional planes are stacked to obtain an accumulated 2D point cloud comprising fiber centers. The 2D point cloud provides a density visualization of transformed fiber centers from the sequence of cross-sectional planes. We use this density information to determine the shape of ply cross-sections. In practice, we take around 1000 cross-sectional planes for each yarn, similar to the resolution of micro-CT measurements. After stacking of the cross-sectional planes, we set $e_X$ and $e_Y$ to twice the standard deviation of the X- and Y-coordinates of all these points, respectively. The resulting ellipse covers approximately 95% of the fiber centers. We rely on the flyaway fiber model to capture the remaining, mostly irregular, fibers.

Besides ply twisting and cross-section parameters, we estimate the number of fibers per ply as $m = \lfloor L_{total}/(L_{ply}K) \rfloor$ where $L_{total}$ indicates the total length of fibers in the measured geometry, $L_{ply}$ denotes the length of a fitted ply center (all $S_i$ curves have identical lengths), and K is the number of plies.

Stage 2 of the pipeline 510 is configured to perform fiber classification. Using the plying information obtained in Stage 1, we untie the plies so that they are all centered around the Z-axis. All fibers in these piles then form a "fiber soup" which will be analyzed in Stage 2 of the pipeline. In this stage, we classify the fibers into regular fibers and flyaway fibers.

To classify each fiber into one of the two categories, we consider its minimal and maximal distances denoted as $d_{min}$ and $d_{max}$ to the ply center (i.e., Z-axis). Given a fiber with n vertices $(x_1, y_1, z_1), \ldots, (x_n, y_n, z_n)$, we have $$d_{min} := \min_{1 \leq i \leq n} \|(x_i, y_i)\|_2,$$

$$d_{max} := \max_{1 \leq i \leq n} \|(x_i, y_i)\|_2.$$

CT measurements of real yarns usually contain alien components (e.g., dust) that do not belong to the yarn. They can be distinguished by large $d_{min}$ values since alien materials tend to stay far from the ply center. In practice, we consider all fibers with $d_{min}$ beyond some threshold as alien and simply ignore them. We then categorize the remaining fibers into regular and flyaway based on their $d_{max}$ values. Intuitively, fibers with small $d_{max}$ values stay close to the ply center and are likely to be regular. On the other hand, those with large $d_{max}$ values are at some point far from the center. Thus, they are considered flyaway.

To robustly obtain the thresholds for respectively identifying alien and flyaway fibers, we consider the means (denoted as $\mu_{min}$, $\mu_{max}$) and standard deviations (denoted as $\sigma_{min}$, $\sigma_{max}$) of all $d_{min}$ and $d_{max}$ values respectively. More particularly, we treat all fibers satisfying $d_{min} > \mu_{min} + c_{min}\sigma_{min}$ as alien, and the remaining ones with $$d_{max} > \mu_{max} + c_{max}\sigma_{max} \qquad (6)$$

as flyaway (where $c_{min}$ and $c_{max}$ are user-specified constants). In practice, we use $c_{min} = c_{max} = 2$ and perform fiber classification separately for each (untied) ply.

Figure 7:
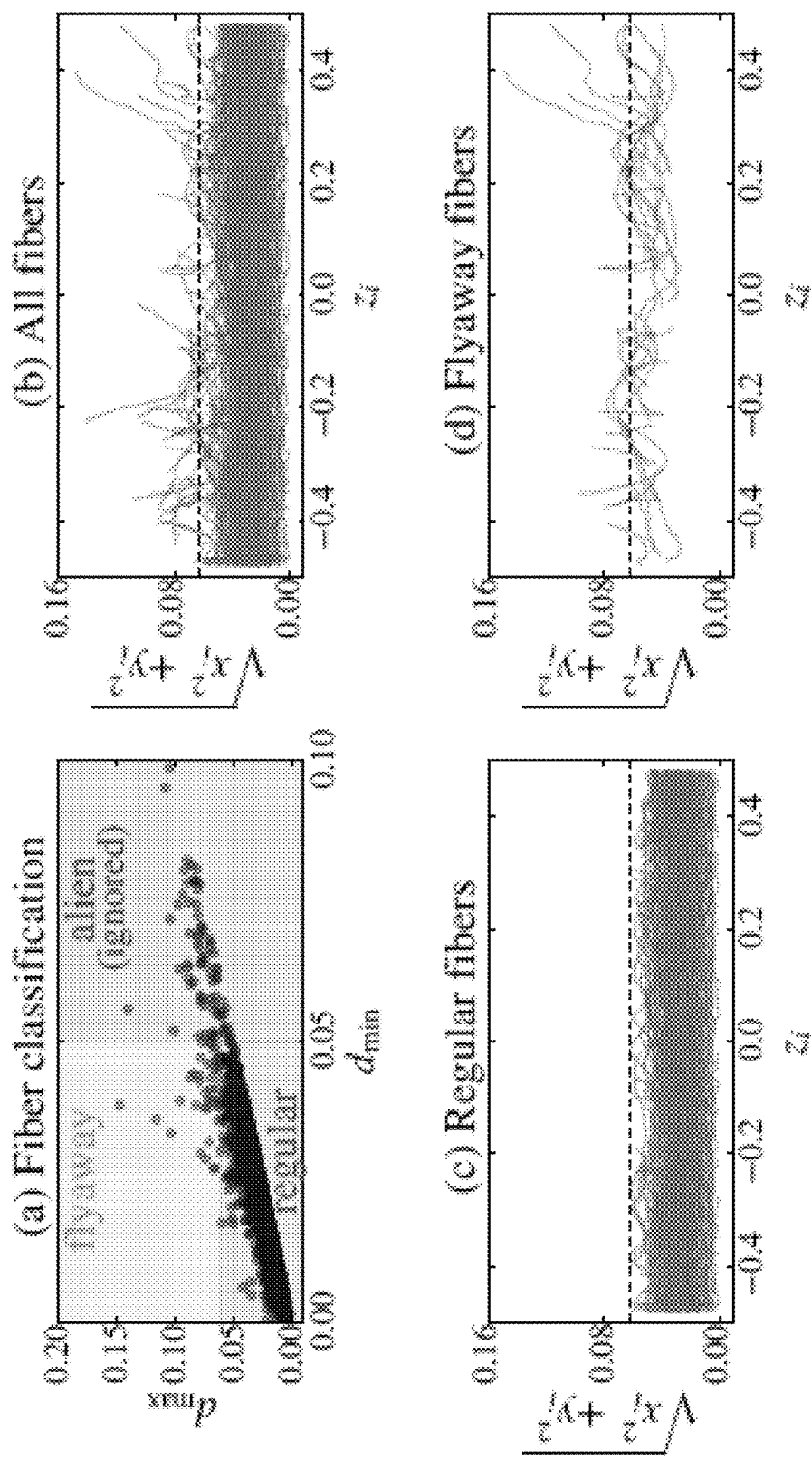
FIG. 7 shows an example of fiber classification in an illustrative embodiment.

FIG. 7 shows an example of the above-described classification process. In this example, we classify all input fibers into two categories: regular and flyaway (with alien ones removed). Part (a) of the figure shows a scatter plot of $(d_{min}, d_{max})$ for each fiber. Parts (b), (c) and (d) show 2D fiber visualizations where the horizontal and vertical axes show $z_i$ and $\|(x_i, y_i)\|_2$ for each fiber vertex, respectively. The dashed line indicates the threshold beyond which a fiber is considered flyaway.

Stage 3 of the pipeline 510 is configured to fit fiber distribution and migration parameters using the regular fibers 515. More particularly, given the set of regular fibers obtained in Stage 2, Stage 3 fits the fiber distribution parameters of Eq. (1) and the fiber migration parameters of Eq. (3). Recall that all these fibers belong to untied plies, meaning that they are all centered around the Z-axis.

In theory, fiber migration parameters $R_{min}$, $R_{max}$ and s, can be recovered from a single regular fiber. However, due to irregularities in real data, using only one fiber generally yields highly unreliable results. Furthermore, many fibers in the input geometry may be short due to limitations of the CT imaging process, making migration parameter estimation even more challenging.

We address this problem by minimizing a reconstruction error defined as:

$$E_{mig}(R_{min}, R_{max}, s) := \sum_i \min E_i(R_i, \theta_i^{(0)} | R_{min}, R_{max}, s), R_i, \theta_i^{(0)} \qquad (7)$$

where the summation is over all regular fibers, and $E_i$ indicates the squared L2 difference between fiber i (represented as a polyline) and the helix generated with $R_i$, $\theta_i^{(0)}$, $R_{min}$, $R_{max}$ and s via Eq. (1) and Eq. (3). Namely, $$E_i(R_i, \theta_i^{(0)} | R_{min}, R_{max}, s) := \int_z \|F_i(z) - \tilde{F}_i(z)\|_2^2 dz, \qquad (8)$$

where $F_i$ and $\tilde{F}_i$ respectively denote the input and generated fibers, both of which are parameterized by z. The limits of this 1D integral are given by the Z-coordinates of $F_i$'s two endpoints. Then, we set $R^*_{min}$, $R^*_{max}$, $s^*$) = arg min $E_{mig}$ ($R_{min}$, $R_{max}$, s).

Minimizing this reconstruction error Eq. (7), however, is non-trivial since the error metric itself includes minimization over $R_i$ and $\theta_i^{(0)}$. Thus, we enumerate a densely sampled set of $R_{min}$, $R_{max}$, and s values. For each combination, we solve the inner optimization problem (i.e., RHS of Eq. (7)). Similar to minimizing Eq. (5), we found it easy to find optimizers for this inner problem and used the same implementation.

After determining the fiber migration parameters, only the cross-sectional fiber distribution remains unknown. Let $R_i^*$ and $\theta_i^{(0)}$ be the minimizers of $E_i(R_i, \theta_i^{(0)} | R_{min}^*, R_{max}^*, s^*)$ for each fiber i. We then apply Maximum-Likelihood Estimation (MLE) over all $R_i^*$ values to obtain the fiber distribution parameters $\in$ and $\beta$. Notice that the density function Eq. (1) is essentially conditional since it is used within a rejection sampling framework (Algorithm 2 of FIG. 4) where R is not uniformly distributed. The unconditional density for the MLE should be:

$$p^{MLE}(R) = 2Rp(R) = 2R\left[(1 - 2\epsilon)\left(\frac{e - e^R}{e - 1}\right) + \epsilon\right]. \qquad (9)$$

Let $q(\in, \beta)$ be the normalization term for Eq. (9)

$$q(\in, \beta) := \int_0^1 p^{MLE}(R) dR, \qquad (10)$$

we have the normalized density function $p_{norm}^{MLE}$ (R|$\in$, $\beta$):=$p^{MLE}(R)/q(\in, \beta)$, which can be used in MLE. In practice, we use Matlab's mle( ) function with q evaluated numerically which can sometimes be prone to (numerically similar) local optima. However, this has caused no visual difference in experimental results.

At this point, we have obtained a set of ply-based and fiber-based parameters which can be used to procedurally generate regular fiber curves. With only regular fibers, however, yarns look unrealistic because they lack irregularities. In the following description, we present an improved flyaway fiber model and we describe how to fit the model parameters given real flyaway fibers obtained in Stage 2.

The flyaway fiber model in illustrative embodiments classifies flyaway fibers into two categories: loop and hair. The hair-type fibers may be viewed as corresponding generally to the first two flyaway classes in J. Voborova et al., "Yarn properties measurement: an optical approach," 2d International Textile, Clothing and Design Conference, pp. 1-6, 2004, which is incorporated by reference herein, while the loop-type fibers may be viewed as corresponding generally to their third class.

Figure 8:
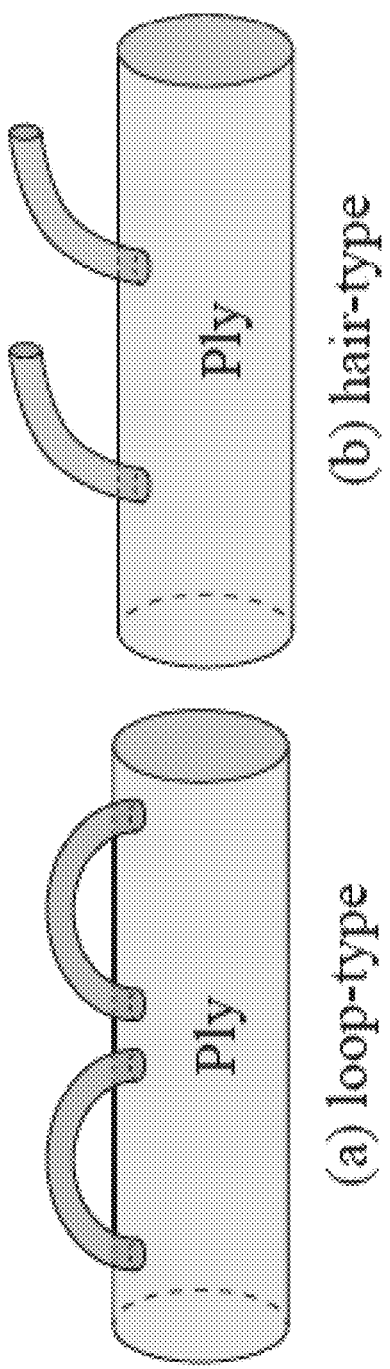
FIG. 8 shows two different types of flyaway fibers in a procedural yarn model in an illustrative embodiment.

FIG. 8 illustrates (a) loop-type and (b) hair-type flyaway fibers in the procedural yarn model.

The loop-type flyaway fibers have both endpoints inside the main ply body. Each of these fibers was originally regular but part of it has been accidentally pulled out during the manufacturing process. The density of these fibers and the distance each loop deviates from the ply center provide an important visual cue on how tight the fibers are twisted.

The above-cited Schröder et al. reference does not explicitly model loop-type flyaway fibers. Instead, they use very strong fiber migrations to achieve similar effects. Unfortunately, their approach cannot easily capture occasionally occurring loop-type fibers, which are the common case in reality, and is instead limited primarily to regularly appearing loops. The procedural yarn models in illustrative embodiments herein have sufficient representative power to capture occasionally occurring loop-type fibers and other similar fiber geometries.

We generate loop-type flyaway fibers by modifying the regular ones built previously (Line 2 of Algorithm 1). When turning a regular fiber into a loop-type flyaway, we randomly pick one of its vertices with Eq. (3) maximized and raise its radius to $R_{max}^{loop}$ (by scaling its X- and Y-coordinates). We also scale up the radii of neighboring vertices belonging to the same migration period (i.e., one period of $R_i(\theta)$ in Eq. (3)).

Figure 9:
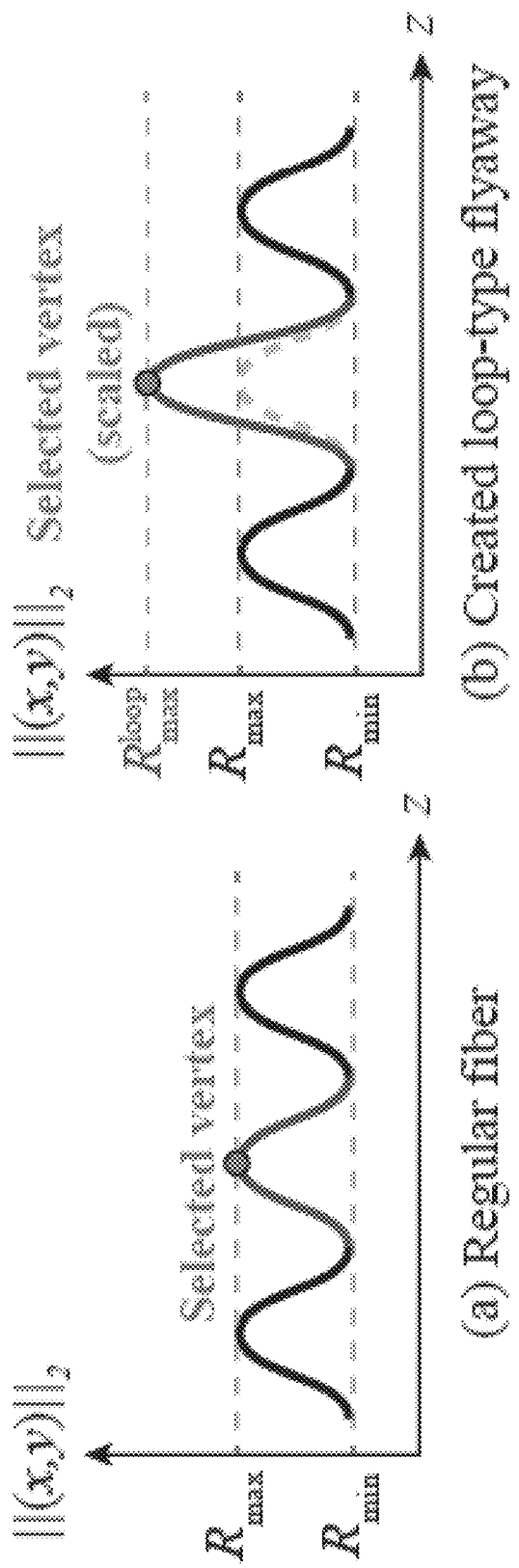
FIG. 9 illustrates the generation of loop-type flyaway fibers in one embodiment.

This process is illustrated in FIG. 9, which shows the generation of loop-type flyaway fibers. In part (a) of FIG. 9, we randomly pick a vertex maximizing the distance to the ply center (indicated by a circle). We then select all vertices belonging to the same migration cycle (shown in lighter shading) and scale their radii so that the selected vertex has radius $R_{max}^{loop}$ afterwards, as illustrated in part (b) of FIG. 9.

To create a set of loop-type flyaway fibers (based on existing regular ones), we draw $R_{max}^{loop}$ from a normal distribution for each of them.

For each ply, we use $\rho^{loop}$ to capture the density of loop-type fibers. Given an untied ply centered around $Z_0 Z_1$ with $Z_0 = (0, 0, z_0)$ and $Z_1 = (0, 0, z_1)$, we repeat the aforementioned process to generate $\lfloor \rho^{loop}(z_1 - z_0) \rfloor$ loop-type flyaway fibers.

With regard to hair-type flyaway fibers, as shown at part (b) of FIG. 8, each such flyaway fiber has one endpoint outside the body of its hosting ply. This type of fiber contributes most significantly to a yarn's hairy appearance. We create a hair-type fiber (for Line 3 of Algorithm 1) by adding its visible (flyaway) part explicitly. That is, we generate an "arc" determined by its starting and ending radii $R_{min}^{hair}$, $R_{max}^{hair}$ (i.e., distance to the ply center), azimuthal angles $\theta_{min}^{hair}$, $\theta_{max}^{hair}$, as well as locations $z_{min}^{hair}$, $z_{max}^{hair}$. We let $R_{span}^{hair} := R_{max}^{hair} - R_{min}^{hair}$, $\theta_{span}^{hair} := \theta_{max}^{hair} - \theta_{min}^{hair}$, and $z_{span}^{hair} := z_{max}^{hair} - z_{min}^{hair}$, such that a hair-type flyaway fiber parameterized by $t \in [0,1]$ can be represented as $$x^{hair}(t) = R^{hair}(t) \cos[\theta^{hair}(t)],$$

$$y^{hair}(t) = R^{hair}(t) \sin[\theta^{hair}(t)],$$

$$z^{hair}(t) = z_{min}^{hair} + z_{span}^{hair} t, \quad (11)$$

with $R^{hair}(t) = R_{min}^{hair} + R_{span}^{hair} t$ and $\theta^{hair}(t) = \theta_{min}^{hair} + \theta_{span}^{hair} t$.

To generate a set of hair-type fibers around a common center with endpoints $z_0$ and $z_1$, we draw $z_{min}^{hair}$ from $U[z_0, z_1]$ and $\theta_{min}^{hair}$ from $U[0, 2\pi]$ for each of them. The other parameters $R_{min}^{hair}$, $R_{span}^{hair}$, $\theta_{span}^{hair}$, and $z_{span}^{hair}$ are sampled from separate normal distributions. Similar to loop-type, we use $\rho^{hair}$ to describe the density of hair-type fibers.

In the above-cited Schröder et al. reference, hair-type fibers are generated by randomly adding short curves with tangent directions disturbed by 3D Perlin noise. Although able to generate hair-like fibers, the oversimplified nature of this approach makes it tricky to match reality and, more importantly, difficult to fit to given measured yarn geometries. Illustrative models disclosed herein, on the other hand, carry clear statistical meaning and are easy to fit to.

It was previously assumed in description of some embodiments that all regular and flyaway fibers were perfectly smooth curves. This level of smoothness rarely exists in reality: real fibers generally contain many small but irregular turns. Accordingly, to mimic this effect, we add small perturbations to all fibers by randomly scaling the radius (i.e., X- and Y-coordinates) of each vertex.

Figure 10:
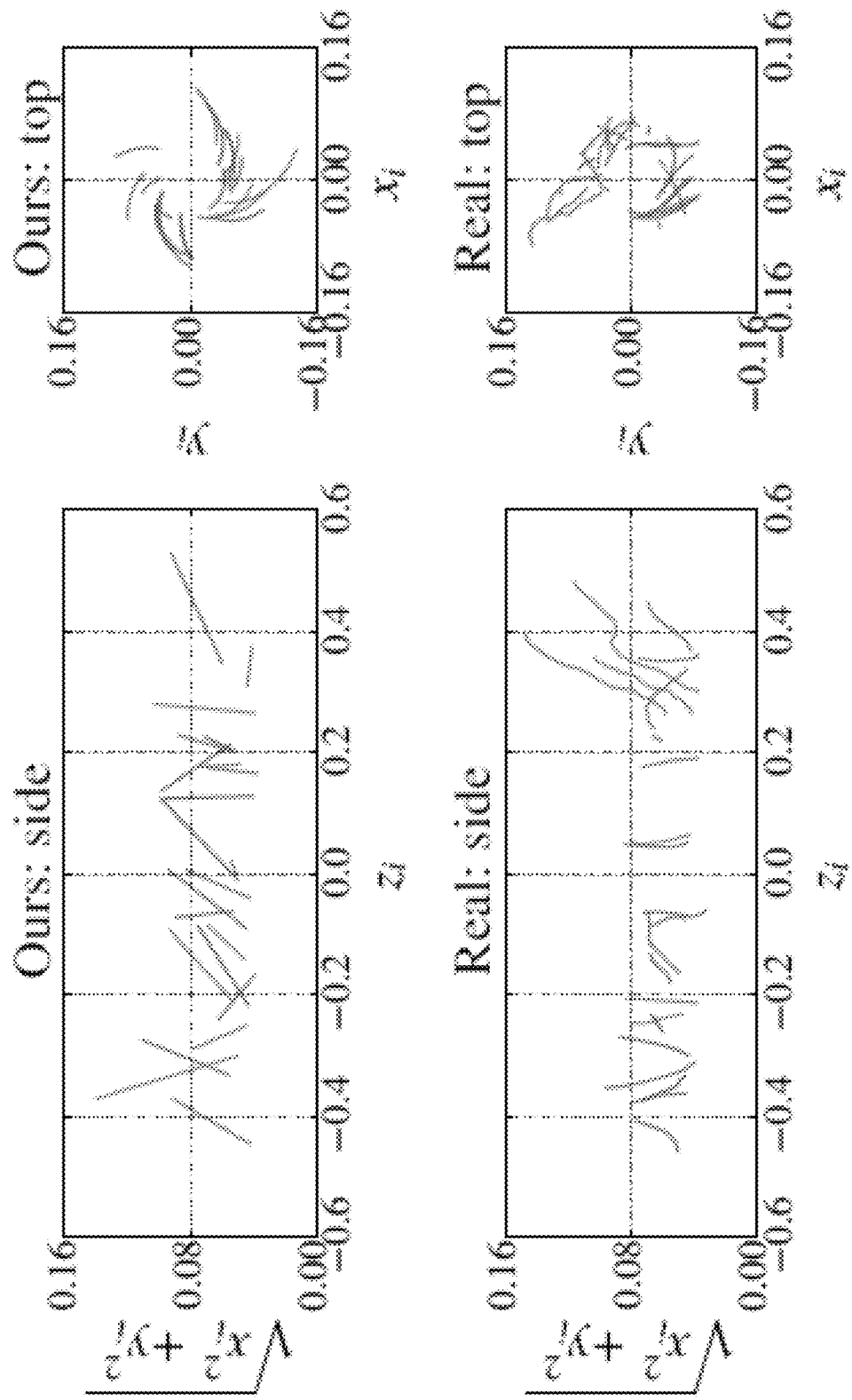
FIG. 10 illustrates simplifications in hair-type flyaway fibers in one embodiment.
Figure 11:
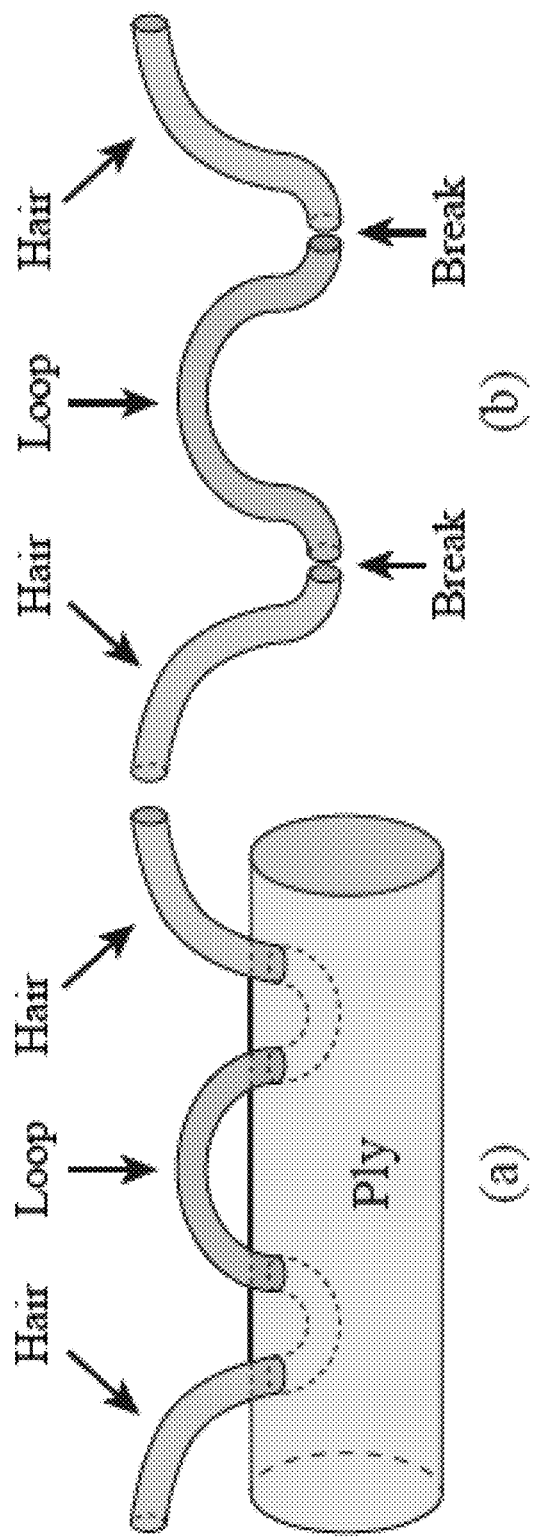
FIG. 11 illustrates splitting of a fiber containing both loop-type and hair-type components into multiple loop and hair segments in one embodiment.

The flyaway fiber model in some embodiments makes two notable simplifications. In particular, the loop-type flyaway fibers always "span" exactly one migration cycle (as demonstrated in FIG. 9), which is generally not the case in reality. Moreover, the hair-type flyaway fibers all have "arc" shapes due to Eq. (11), while real hair-type fibers normally have more complex trajectories, as illustrated in FIG. 10. More particularly, the top portion of this figure shows the simplifications made by the hair-type flyaway fiber model, illustrating that hair-type flyaway fibers in accordance with the flyaway fiber model have arc shapes. The bottom part of FIG. 10 illustrates that real hair-type fibers have more complex trajectories.

Despite these simplifications, we match overall yarn appearance well. The simplifications are introduced in illustrative embodiments to ensure that the flyaway fiber model can be reliably fitted from measurements containing limited number of flyaway fibers. In other embodiments, with greater amounts of available measurements, flyaway fiber models based on more complex statistical distributions could be implemented.

Model fitting for the flyaway fiber model will now be described in more detail. Recall that in Stage 2, fibers from untied plies are classified as regular and flyaway. Given the flyaway fiber model, we now describe how to fit model parameters, i.e., $\rho_{hair}$, $R_{min}^{hair}$, $R_{span}^{hair}$, $z_{span}^{hair}$, and $\theta_{span}^{hair}$ for hair-type ones, as well as $\rho_{loop}$ and $R_{max}^{loop}$, for loop-type ones. Notice that $z_{min}^{hair}$ and $\theta_{min}^{hair}$ are not fitted as we sampled them uniformly in the generation process.

After obtaining flyaway fibers for each untied ply, we start the fitting process by identifying the loop and hair components of each fiber. As illustrated in part (a) of FIG. 11, one flyaway fiber can contain both components. Thus, for each of them, we start by checking if any of its endpoints has a radius (i.e., $\|(x,y)\|_2$) above the flyaway threshold Eq. (6). If so, we cut off the corresponding end of the fiber at vertices where the radius is both at a local minimum and below the threshold and add it to the collection of hair-type flyaway fibers. The remaining part (if any) is then added to the set of loop-type fibers. This fiber-splitting operation is illustrated in part (b) of FIG. 11.

After all fibers have been processed, we obtain the flyaway densities $\rho^{loop}$ and $\rho^{hair}$ using the number of corresponding fibers divided by the length of the untied ply (i.e., $z_1 - z_0$). Then, for every loop-type fiber, we compute the radii of all its vertices and set $R_{max}^{loop}$ as the maximum. Similarly, $R_{min}^{hair}$, $R_{span}^{hair}$, $\theta_{span}^{hair}$, $z_{span}^{hair}$ can be evaluated for each hair-type fiber by examining its vertices. We then compute the sample mean and standard deviation for each of these quantities, which can be used to generate hair-type fibers via Eq. (11).

With flyaway fiber parameters fitted, we now have recovered the values of all of the procedural yarn model parameters listed in Table 1. Using Algorithm 1, or another type of procedural yarn generation algorithm, realistic yarn geometries can now be generated by the image rendering system 120 without the need for additional cumbersome CT measurements.

The multi-stage parameter fitting pipeline 110 as described above provides a number of significant advantages relative to conventional techniques.

For example, the procedural yarn models described above represent fabric micro-geometry procedurally, via specifically tailored probability distributions, and enjoy high fidelity, compact representation, and easy editability.

Illustrative embodiments allow fiber-level details to be added to yarn-based cloth designs produced by textile software and simulation tools. The added details can lead to significantly higher rendering quality and greatly benefit design applications as well as numerous other computer graphics applications.

In addition, the fitting algorithm is fast. Given preprocessed CT data input data 511, it takes fewer than ten CPU core minutes to fit each yarn. The fitting algorithm is also well-behaved in that, despite the presence of non-convex optimization, we did not observe any visual difference caused by local minima.

Moreover, procedural yarns generated with using the procedural yarn models produced by the parameter fitting pipeline 110 closely capture the statistics of the measured geometries, conveying a convincing impression of the corresponding yarn types. This was validated by comparing full renderings of procedural yarns generated using the models with photographs of the corresponding actual yarns. Additional improvements can be obtained in some embodiments by scanning multiple copies of the same type of yarn for variety and feeding all the information to the parameter fitting algorithm.

Furthermore, illustrative embodiments do not rely on replicating (i.e., tiling) small pieces of fabrics. Thus, we produce realistic, non-repetitive details.

The procedural yarn model representation in illustrative embodiments is extremely compact. For example, before instantiating fibers using Algorithm 1, only a limited set of parameter values, listed in Table 1 above, are stored for each type of yarn. By combining these distributional parameters with a sparse set of yarn center curves, highly detailed textile models can be generated.

Without these small-scale details, the renderings offer limited quality. With added micro-geometry, on the other hand, the textiles appear much more realistic. Models constructed by illustrative parameter fitting approaches described herein are fully procedural, offering easy editability.

For example, fiber twisting parameters can be adjusted so that the fibers are better aligned. Such a fiber-level modification not only results in significantly stronger anisotropic highlights, but also causes the fabric to become less transparent. This is because when the fibers are better aligned, they tend to block light more effectively by having fewer "gaps."

As another example, one can change the flyaway distribution in order to affect overall appearance of a fabric globally. By increasing the density of flyaway fibers, the entire cloth becomes significantly fuzzier, resulting in less structured highlights but more small random ones or "glints."

As a further example, altering the ply cross-sections to exhibit a more elliptical shape changes the underlying fiber structure dramatically, which leads to reduced overall glossiness. This further demonstrates the versatility of the illustrative modeling approaches and the significance of precise fitting of model parameters.

The parameter fitting pipeline 110 in illustrative embodiments is configured to solve several non-convex optimization problems. Alternative embodiments can implement advanced solution techniques for better numerical accuracy and performance.

In some embodiments, processes for rendering textiles with yarns represented by respective procedural yarn models realize all fibers using Algorithm 1 of FIG. 3. Alternative embodiments implement more efficient rendering algorithms that directly work on the procedural yarn geometry. Examples of these more efficient rendering algorithms will be described in detail below with reference to FIGS. 12 through 21.

In illustrative embodiments described above, certain simplifying assumptions are made. For example, ply cross-sections are assumed to be elliptical and spatially invariant, which can cause small geometric mismatches for certain types of fibers. These assumptions can be relaxed in other embodiments. Also, flyaway fibers have relatively simplified shapes. Alternative embodiments can be configured to further generalize the yarn models and utilize corresponding fitting techniques. Finally, the level of geometric variance that can be captured in illustrative embodiments may be limited by the maximal sample size a micro-CT scanner can take. Alternative embodiments can use other types of measurements in order to more accurately large yarn-level variations that are difficult to measure using micro-CT scanning.

As indicated previously, accurately modeling the appearance of fabrics is important for many design, prototyping, and entertainment applications. To accurately match reality, prior micro-appearance models either rely on data-intensive data sets or require tricky, manual parameter tweaking. We introduce a technique which bridges this gap, and thus enjoys advantages of both worlds while avoiding their weaknesses. Illustrative embodiments automatically fit procedural yarn models to accurate physical measurements obtained using volume imaging. The resulting models, which involve only a limited number of parameters (e.g., 22 floating point numbers) for each yarn type, can be used to synthesize large textiles with high visual quality and without repetitive patterns. The statistical meaningfulness of these models also allow intuitive editing.

Procedural yarn models disclosed herein are compact, easy to edit, and can achieve state-of-the-art realism with fiber-level details. However, when used for procedural yarn generation using a procedural yarn generation algorithm such as Algorithm 1 of FIG. 3, these models generally need to be fully instantiated (i.e., realized) into 3D volumes or fiber meshes and stored in memory. In other words, to render procedural yarns using these models, they would typically have to be converted back to expensive data-driven formats as either high-resolution volume-based representations or detailed polygonal meshes representing large collections of cloth fibers. This need for full realization fundamentally limits the practical use of procedural models since it not only neglects the benefits offered by being procedural, but also causes large textiles (e.g., those with thousands of yarns, and correspondingly millions of fibers) practically unrenderable due to the excessive amount of data required.

We now describe novel realization-minimizing techniques that enable physically based rendering of procedural textiles, without the need for full model realizations. These techniques provide new data structures and search algorithms that look up regular and flyaway fibers on the fly, efficiently and consistently. The techniques work with compact fiber-level procedural yarn models in their exact form with no approximation imposed. In practice, illustrative embodiments implementing such techniques can render very large models that are practically unrenderable using existing methods, while using considerably less memory (60-200× less) and achieving good performance.

Mathematically, the micro-geometry of a procedural textile is fully determined by the underlying model parameters. So, in principle, all properties (e.g., local material density and albedo) needed for physically based rendering of a procedurally described textile can be computed on the fly. Unfortunately, because of the complex relationship between the procedural model parameters and the rendering properties, it is challenging to compute these properties on the fly.

In illustrative embodiments to be described below, we introduce novel realization-minimizing techniques for physically based rendering of large-scale procedural textiles. The framework in these embodiments retains the full generality of the procedural model by working with its state-of-the-art form exactly, and imposes no approximations. It includes new data structures and volumetric search algorithms connecting the procedural model parameters and material optical properties in an efficient and consistent way.

More particularly, the rendering technique in an illustrative embodiment provides a volumetric representation allowing the material properties (e.g., optical density) to be queried at render time with only a small fraction of the full model realized. These volumes can then be rendered using standard Monte Carlo solutions (e.g., volume path tracing) to the anisotropic radiative transfer problem.

We have confirmed the practical impact of this approach using a variety of virtual textiles, from wovens to knits, at widely different scales. The level of fidelity and detail offered by the realization-minimizing techniques disclosed herein not only creates realistic zoomed renderings, but also enables predictive reproduction of fabric appearance based on their fundamental (fiber-level) properties. Such predictive rendering is critical for design and virtual prototyping applications.

To procedurally specify the fiber distribution within a single yarn, we use a procedural yarn model similar to that previously described herein. Aspects of this model will be reintroduced below. Eq. (12) and (13) below assume all fibers in a yarn are twisted around one common center, the Z-axis. In reality, many yarns consist of multiple substrands, or plies, such that the fibers reside around individual ply centers (which are then twisted around the yarn center). For better readability, we initially assume all yarns to be single-ply, and then generalize to handling multi-ply yarns.

Assuming the yarn center to be the Z-axis, each fiber j is then modeled as a circular helix $h_j^{reg}$ parameterized by z:

$$h_j^{reg}(z) := \left[ R_j \cos\left(\theta_j + \frac{2\pi z}{a}\right), R_j \sin\left(\theta_j + \frac{2\pi z}{a}\right), z \right], \quad (12)$$

where $R_j$ and a respectively control the radius and pitch of $h_j^{reg}$. To better capture the migration of fibers exhibited by real-world yarns, $R_j$ in Eq. (12) is further allowed to vary in a sinusoidal pattern via $$R_j(z) = r_{min} R_j + \frac{r_{max} - r_{min}}{2} R_j \left[ \cos\left( s \frac{2\pi z}{a} + \theta_j^{(0)} \right) + 1 \right], \quad (13)$$

where $r_{min}$, $r_{max}$ are two scaling factors that determine the range of $R_j(z)$, s specifies the period of one cycle, and $\theta_j^{(0)}$ gives the phase of the variation. In Eq. (12) and (13), a, $r_{min}$, $r_{max}$, and s are shared by all fibers in a yarn while, $\theta_j$, $\theta_j^{(0)}$, and $R_j$ are per-fiber properties. In practice, $\theta_j$, $\theta_j^{(0)}$ are sampled uniformly and $R_j$ is drawn from a cross-sectional fiber distribution with parameters $\varepsilon$, $\beta \in \mathbb{R}_+$ using rejection sampling upon the (unnormalized) probability density:

$$p(R) := (1 - 2\varepsilon)\left(\frac{e - e^R}{e - 1}\right) + \varepsilon. \quad (14)$$

Fibers captured by Eq. (12), (13), and (14) are considered regular as they closely follow the yarn center. In reality, however, irregularities exist: some fibers may deviate from the main stream and leave open endpoints or loops beyond the main textile surface. Despite being small in number, these flyaway fibers are visually significant as they are the main cause for a fabric's fuzzy appearance. The procedural yarn model in embodiments herein describes flyaway fibers in two categories: hair and loop.

Figure 12:
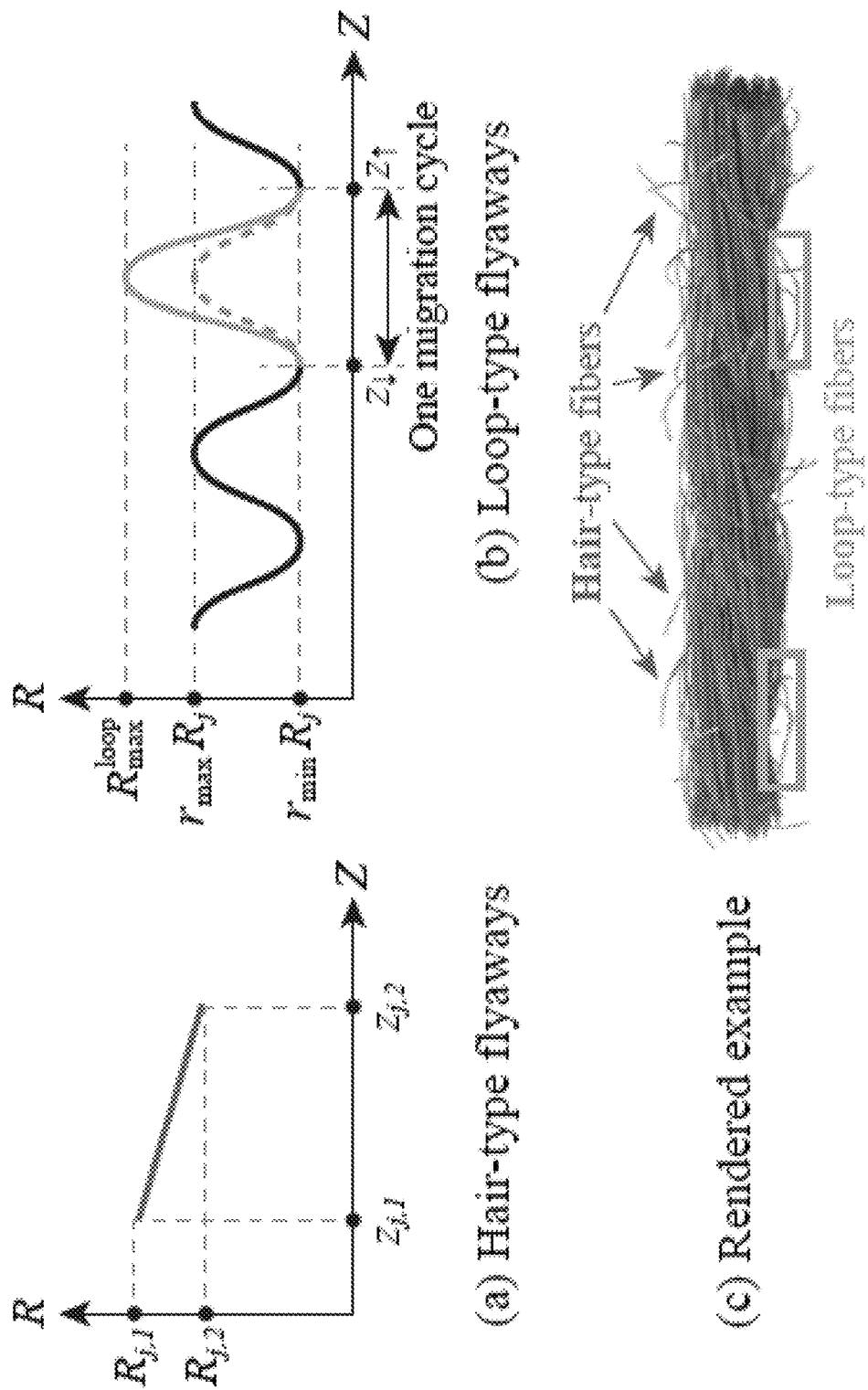
FIG. 12 shows examples of flyaway fiber models in an illustrative embodiment.

FIG. 12 illustrates examples of models for respective hair and loop flyaway fibers. The figure includes parts (a), (b) and (c). Part (a) shows that hair-type flyaway fibers are described as arcs with endpoints specified in z, R, and θ. Part (b) shows that loop-type flyaway fibers are obtained by mutating entire migration cycles (marked with lighter shading) of regular fibers. Part (c) illustrates a rendering of a single yarn with both types of flyaway fibers.

More particularly, given $z_{j,1}$, $z_{j,2} \in [0, h]$ and $R_{j,1}$, $R_{j,2}$, $\theta_{j,1}$, $\theta_{j,2} \in \mathbb{R}$, each hair-type flyaway fiber j is treated as an arc parameterized by $z \in [z_{j,1}, z_{j,2}]$:

$$h_j^{hair}(z) = [R_j^{hair}(z)\cos \theta_j^{hair}(z), R_j^{hair}(z)\sin \theta_j^{hair}(z), z], \quad (15)$$

where $R_j^{hair}$ and $\theta_j^{hair}$ are linearly interpolated in $R_{j,1}$, $R_{j,2}$ and $\theta_{j,1}$, $\theta_{j,2}$, respectively (see part (a) of FIG. 12). The loop-type flyaway fibers, on the other hand, are created by mutating existing regular fibers. When creating one loop-type fiber, one migration cycle $(z_\downarrow, z_\uparrow)$ is selected from a randomly chosen regular fiber j such that $z_\uparrow - z_\downarrow = a/s$ and $R_j(z_\downarrow) = R_j(z_\uparrow) = r_{min} R_j$. The corresponding fiber segment $\{h_j^{reg}(z) | z \in [z_\downarrow, z_\uparrow]\}$ then has its radius $R_j(z)$ scaled up uniformly to reach some randomly drawn radius $R_{max}^{loop}$ at its maximum, creating a visible loop, as illustrated in part (b) of FIG. 12.

To compose multiple procedurally described yarns into full textiles, we deform them to follow arbitrary center curves instead of the Z-axis. Formally, we seek a transformation $f: \mathbb{R}^3 \to \mathbb{R}^3$ per yarn that converts yarn-space coordinates centered around the Z-axis to fabric-space ones following an arbitrary smooth curve, as illustrated in FIG. 13.

Figure 13:
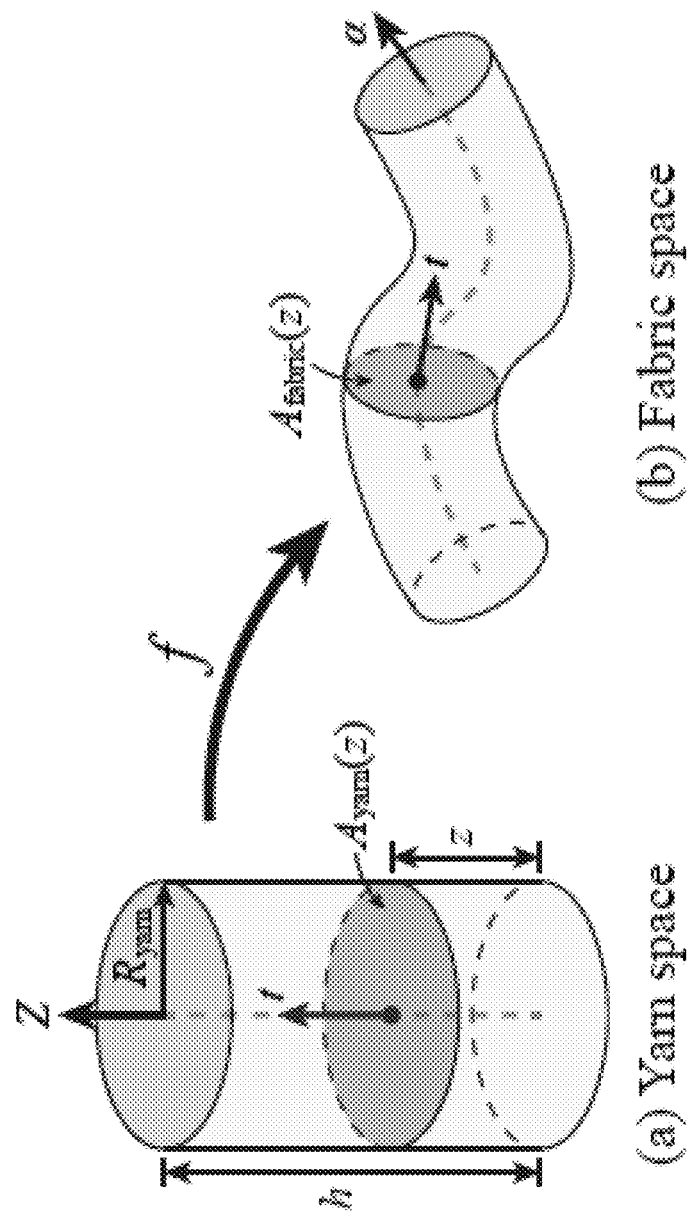
FIG. 13 illustrates transformation from yarn space to fabric space in one embodiment.

FIG. 13 includes parts (a) and (b) corresponding to yarn space and fabric space, respectively. In the yarn space (a), all constituent fibers are assumed to follow one common center: the Z axis. In the fabric space (b), arbitrary smooth curve α, parameterized by arc length, is used to specify the yarn center. Transformation $f: \mathbb{R}^3 \to \mathbb{R}^3$ maps locations from the yarn space to the fabric space. In particular, it maps yarn-space cross-section $A_{yarn}(z)$ to the fabric-space one $A_{fabric}(z)$.

Accordingly, given a curve α parameterized by arc length, ƒ maps each cross-section in yarn space to the corresponding one in fabric space. More particularly, assume without loss of generality that the yarn-space center curve has endpoints [0,0,0] and [0, 0, h] for some h>0. Then, ƒ should transform any yarn-space cross-section $$A_{yarn}(z):=\{(x,y,z)|x,y\in \mathbb{R}\},\quad (16)$$

for some $z_0\in[0, h]$ to the corresponding one in fabric-space, given by:

$$A_{fabric}(z):=\{r\in \mathbb{R}^3|\langle t(z),r-\alpha(z)\rangle=0\},\quad (17)$$

where $\langle \bullet, \bullet \rangle$ is the inner product operator, and $$t(z):=\left(\frac{d}{dt}\alpha\right)(z)$$

denotes the tangent direction of α at z. This can be achieved by setting:

$$f([x,y,z])=xn(z)+yb(z)+\alpha(z),\quad (18)$$

where n(z) denotes the normal direction at α(z) and b:=t×n. It is easy to verify that Eq. (18) maps the yarn-space center curve $\{(0, 0, z)|z\in[0, h]\}$ to the fabric-space one α.

In illustrative embodiments to be described, we use a volumetric representation to render procedural textiles because (i) without highly detailed fiber surfaces, these models render faster; and (ii) the rendering process only requires accessing material properties locally, which is desirable for developing solutions with minimal model realization. Alternative arrangements can be used in other embodiments.

The volumetric formulation utilizes several parameters that are specified at each 3D location inside a fabric's bounding volume: the extinction coefficient $\sigma_t$, single-scattering albedo α, and the phase function $f_p$.

In the context of cloth rendering, these parameters are generally derived from the local density, tangent direction, and the cloth fibers' optical properties. The optical properties can be characterized by models that describe light scattering within cloth fibers. For example, in accordance with a volumetric model, textiles with fiber-level details can be represented as anisotropic participating media. Under this framework, light transport within a medium is governed by the above-noted extinction coefficient $\sigma_t$, the single-scattering albedo α, and the phase function $f_p$.

In case of volumetric cloth, these parameters are further specified using the micro-flake model. Given any point p inside the cloth volume, parameters including local material density den (p), direction dir (p), fiber roughness σ(p) and albedo α(p), are expected to be provided by the user. Then, a distribution D (p, m) of flake normals m at p (analogous to normal distributions used by micro-facet models) is determined using dir (p) and σ(p). Lastly, the three radiative transfer parameters $\sigma_t$, α, and $f_p$ are obtained using den (p), α(p), and D(p, m).

Realization-minimizing model lookups will now be described in greater detail. Such techniques are configured to access procedurally described textiles without fully realizing fiber geometry. At each location $p\in\mathbb{R}^3$ in fabric space, the procedural model provides local material density $den(p)\in \mathbb{R}_+$, and direction information $dir(p)\in \mathbb{S}^2$, which in turn determine the radiative transfer parameters used for rendering.

Figure 14:
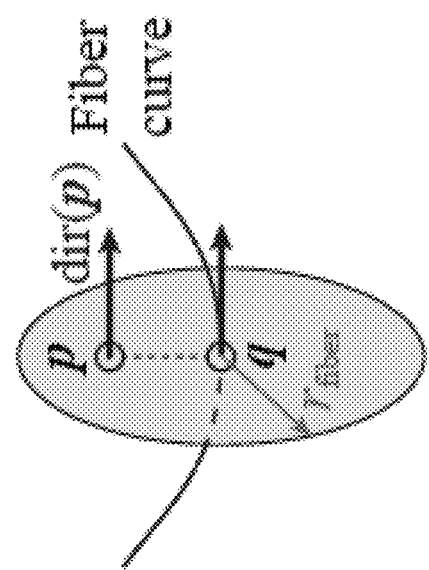
FIG. 14 illustrates computation of local fiber density and direction information for a point in fabric space in one embodiment.

In principle, den(p) and dir(p) can be determined based on the fabric-space locations of individual fibers, as illustrated in FIG. 14. Given p, if there exists a fiber curve such that the minimal distance from p to this curve is below the fiber's radius, then den(p) equals the density of this fiber; otherwise, den(p)=0. When den(p)>0, we further compute the projection q of p on the fiber curve and set dir(p) to the tangent direction at q. In this way, computing material density and direction at any given location p reduces to searching for a fiber curve lying close enough to this point and finding its projection q on that curve (if there exists one), as outlined in Algorithm 3 of FIG. 15.

We describe a novel solution to this problem without creating complete model realizations. One possible objective is to render large-scale procedural textile models exactly (i.e., not approximating the model itself) while minimizing the amount of data needed to be realized and preserving, as much as possible, rendering performance.

The input in some embodiments includes a set of n yarn curves $\alpha_1, \alpha_2, \ldots, \alpha_n$, and per-yarn parameters for (i) the procedural fiber geometry used by Eq. (12), (13), (14), and (15); and (ii) the material's optical properties including density and single-scattering albedo.

Notice that, although the input contains explicitly stored yarn curves, the amount of data involved is negligible compared to a fully realized model. This is because for each yarn, the input contains only a single curve while the fully realized version would involve hundreds of fiber curves. Allowing explicitly described yarn centers also enjoys high flexibility. For instance, we can directly take yarn-based simulation results and add procedural fiber-level details to these models to produce high-quality renderings.

To determine the local fiber density and direction at a given fabric-space point p, we first determine the yarn to which this point belongs (if any) so that further checks based on the procedural model can be performed (Line 2 of Algorithm 3).

Since each yarn in the fabric space occupies a pipe-shaped volume determined by the yarn's center curve and radius (part (b) of FIG. 13), a yarn contains p if and only if the minimal distance from this point to the yarn's center falls below its radius. To efficiently identify all such yarns, we leverage a point Kd-tree containing the vertices of all yarn curves. Additional description of this step is provided below.

In implementing fabric-to-yarn-space transformation, for each yarn i containing p we check if this point is indeed covered by a constituent fiber. Since all fibers are described procedurally in yarn space via Eq. (12), (13), and (14) for regular ones as well as Eq. (15) for flyaway fibers, it is desirable to perform the check in this same space. We, therefore, transform p back to the corresponding yarn space location $p^{yarn}$ (Line 4 of Algorithm 3) by inverting the transformation specified by Eq. (18). Namely, $$p^{yarn}=f_i^{-1}(p),\quad (19)$$

where the subscript i emphasizes that ƒ varies across different yarns. Let $p^{yarn}=[x, y, z]$, Eq. (18) then gives $$xn_i(z)+yb_i(z)=p-\alpha_i(z),$$

where $\alpha_i$ denotes the center curve of yarn i, and $n_i$, $b_i$ are respectively the normal and bitangent directions along $\alpha_i$. Here we assume $t_i$, $n_i$, and $b_i$ are all given with $\alpha_i$. In practice, we compute these directions using $a_i$.

Since $n_i(z)$ and $b_i(z)$ are orthogonal to each other, it holds that $$x=\langle p-\alpha_i(z),n_i(z)\rangle,\ y=\langle p-\alpha_i(z),b_i(z)\rangle,\quad (20)$$

and evaluating Eq. (19) reduces to finding a proper z.

Let q be the projection of p on $\alpha_i$, then p and q belong to the same fabric-space cross-section. Since $f$ maps yarn-space cross-sections (Eq. (16)) to the corresponding ones in fabric space (Eq. (17)), $p^{yarn}$ and $q^{yarn}$ should come from the same yarn-space cross-section and share identical z coordinates. In practice, q is obtained when computing the minimal distance between p and the yarn center. After finding $q=\alpha_i(z)$, $p^{yarn}$ can be obtained using Eq. (20) as $$p^{yarn}=[\langle p-\alpha_i(z),n_i(z)\rangle,\langle p-\alpha_i(z),b_i(z)\rangle,z].$$

With $p^{yarn}$ determined, we then check if it is covered by a regular or a flyaway fiber based on the procedural model.

Regular fiber lookups will now be described in more detail. Regular fibers form the main body of a yarn, and properly capturing their structure is crucial for reproducing a textile's overall appearance, from specular highlights to textures.

Thus, the goal in some embodiments is to develop a realization-minimizing technique to look up regular fibers. This is not difficult if there is no fiber migration (i.e., $R_j$ in Eq. (12) remains constant), but it is challenging with migration which adds important visual irregularity. We now discuss how to address this problem.

Figure 16:
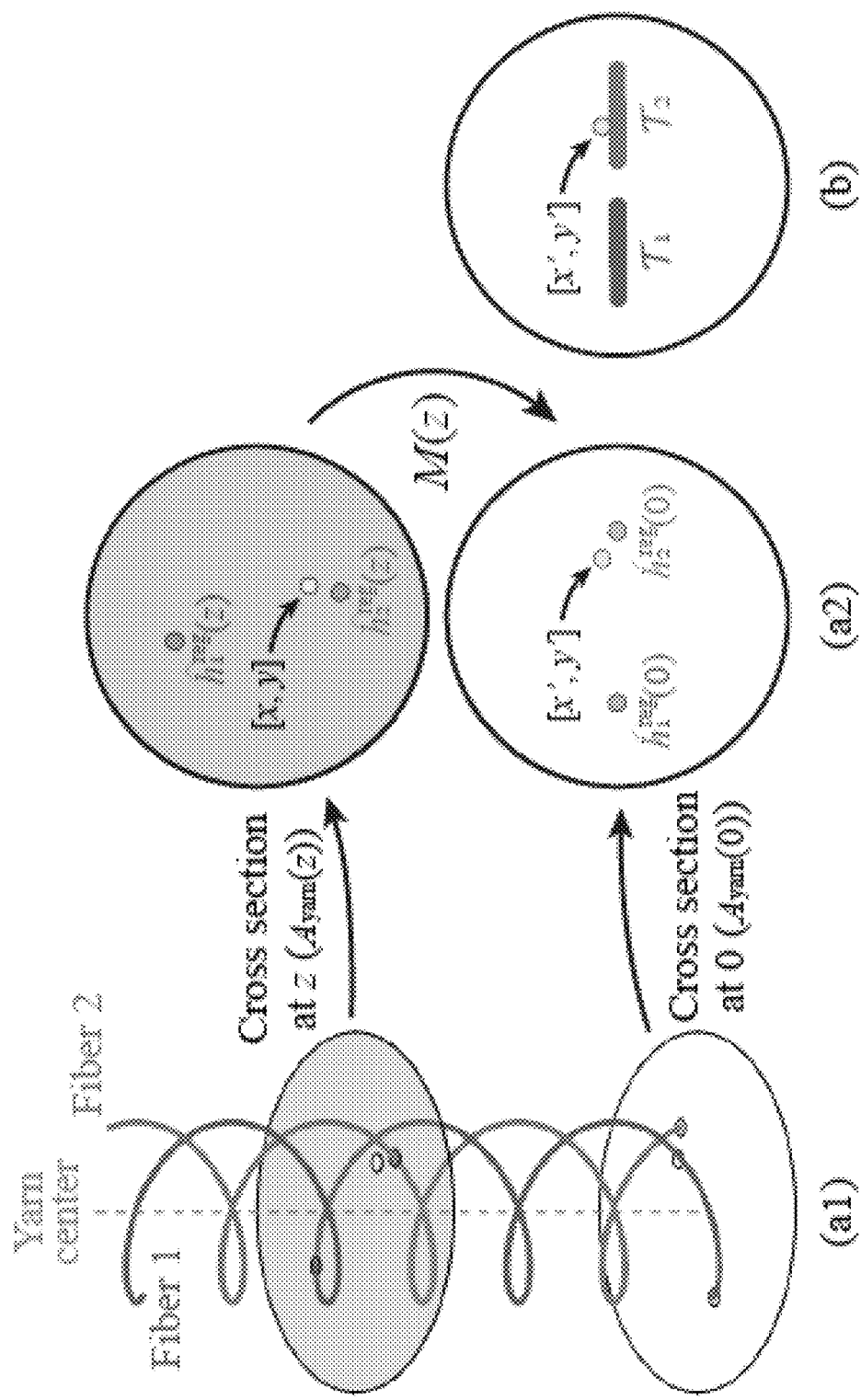
FIG. 16 illustrates regular fiber lookups in one embodiment.

FIG. 16 illustrates regular fiber lookups, and includes parts (a1), (a2) and (b). A yarn-space point $p^{yarn}=[x, y, z]$ is covered by a regular yarn if there is a fiber center $\hat{h}_j^{reg}(z)$ located close enough to [x, y] in the cross-section $A_{yarn}(z)$. Without fiber migration, all fiber locations are identical at each cross-section up to a global rotation M. Thus, one can determine if the rotated version $[x', y']:=[x, y]M(z)$ is close enough to some $\hat{h}_j^{reg}(0)$ within $A_{yarn}(0)$. With fiber migration, we reason about the trajectory $\mathcal{T}_j$, namely all possible locations $h_j^{reg}(z)M(z)$ can take, for each fiber j. This allows us to quickly prune all fibers whose trajectories have stayed far from [x', y'].

The procedural model describes regular fibers as helices using Eq. (12). Since $h_j^{reg}$ is parameterized with z, we determine whether a given yarn-space location $p^{yarn}=[x, y, z]$ is covered by a regular fiber in the cross-sections $A_{yarn}$ under the same parameterization. As indicated above, we let $\hat{h}_j^{reg}(z)$ denote the cross-sectional location of fiber j, which equals the sub-vector of $\hat{h}_j^{reg}(z)$ involving its X and Y components. Then, $p^{yarn}$ is covered by a regular fiber j if and only if [x, y] and $\hat{h}_j^{reg}(z)$ lie close enough (see part (a1) of FIG. 16). We now introduce an efficient approach to determine the existence of such j.

We first consider the special case where fiber migration as specified in Eq. (13) is ignored. In this case, for each regular fiber j, the cross-sectional location $\hat{h}_j^{reg}(z)$ stays at a constant distance $R_j$ from the yarn center (i.e., the Z-axis). Since all fibers share the same pitch $\alpha$, all cross-sectional fiber locations remain static relative to each other. In other words, all fiber locations $\hat{h}_1^{reg}(z), \hat{h}_2^{reg}(z), \ldots$ are simply a rotated version of $\hat{h}_1^{reg}(0), \hat{h}_2^{reg}(0), \ldots$ (see part (a2) of FIG. 16). In particular, for all j, it is easy to verify that $$\hat{h}_j^{reg}(z)M(z)=[R_j\cos\theta j, R_j\sin\theta_j]=\hat{h}_j^{reg}(0), \quad (21)$$

where M(z) is a 2×2 rotation matrix given by $$M(z)=\begin{bmatrix}\cos(2\pi z/a) & -\sin(2\pi z/a)\\ \sin(2\pi z/a) & \cos(2\pi z/a)\end{bmatrix}.$$

Therefore, to check if $p^{yarn}=[x, y, z]$ is contained in a fiber, we can rotate [x, y] by applying the same M(z) as Eq. (21) to obtain [x', y']:=[x, y]M(z) and determine if [x', y'] is covered by a cross-sectional fiber in the cross-section at z=0 (see part (a2) of FIG. 16).

To check if this is the case, we store $\hat{h}_j^{reg}(0)$ for all fibers in all yarns. Then, the whole search for fibers covering $p^{yarn}$ becomes a 2D nearest neighbor (NN) lookup around [x', y'] in the cross-section $A_{yarn}(0)$. This is a standard problem that has been thoroughly studied and can be solved very efficiently. Notice that, compared to fully realizing all fibers which requires storing complete fiber curves, the method in illustrative embodiments consumes orders of magnitude less memory as it only stores two floating numbers per regular fiber.

As mentioned previously, real-world fibers generally do not stay at a constant distance from the yarn center. This irregularity is visually important, but is challenging to model without a completely instantiated model.

In some embodiments, the migration of fibers is modeled procedurally via Eq. (13). Then, Eq. (21) no longer holds: instead, $\hat{h}_j^{reg}(z)M(z)$ now varies with z:

$$\hat{h}_j^{reg}(z)M(z)=[R_j(z)\cos\theta j, R_j(z)\sin\theta_j], \quad (22)$$

where $R_j(z)$ is given by Eq. (13). Since Eq. (22) does not equal $\hat{h}_j^{reg}(0)$ in general, whether $p^{yarn}=[x, y, z]$ is covered by a regular fiber can no longer be determined by checking if [x, y]M(z) lies close enough to $\hat{h}_j^{reg}(0)$ for some fiber j.

To address this problem, we consider all possible values $\hat{h}_j^{reg}(z)M(z)$ can take. If [x, y]M(z) stays far away from all these values, [x, y, z] cannot be covered by fiber j. More particularly, let $\mathcal{T}_j \subset \mathbb{R}^2$ be the trajectory of $\hat{h}_j^{reg}(z)M(z)$ for all $z\in\mathbb{R}$. Then, $$\begin{aligned}\mathcal{T}_j := & \{\hat{h}_j^{reg}(z)M(z) \mid z\in\mathbb{R}\} \\ = & \{[R\cos\theta_j, R\sin\theta_j] \mid R\in[r_{min}R_j, r_{max}R_j]\},\end{aligned} \quad (23)$$

where the second equality follows Eq. (13) and (22). As $\cos\theta_j$ and $\sin\theta_j$ are fixed in Eq. (23), $\mathcal{T}_j$ represents a line segment with slope $\tan\theta_j$ and intercept zero (see part (b) of FIG. 16). Since $\mathcal{T}_j$ captures all possible values of $\hat{h}_j^{reg}(z)M(z)$, a yarn-space point [x, y, z] cannot be covered by fiber j if the minimal distance between [x, y]M(z) and $\mathcal{T}_j$ is greater than the fiber radius. Thus, we can pre-compute and store $\mathcal{T}_j$ as tuples of $(r_{min}R_j, r_{max}R_j, \theta_j)$ for all fibers. Notice that, compared to the migration-free case where $\hat{h}_j^{reg}(0)$ is used, $\mathcal{T}_j$ only takes one extra floating number per fiber to describe.

At render time, given $p^{yarn}=[x, y, z]$, we then select all fibers j with trajectories $\mathcal{T}_j$ lying close enough to $[x', y']:=[x, y]M(z)$. To do this efficiently, we partition the domain of $\theta_j$, namely [0, $2\pi$), into a few equal sized components $B_1, B_2, \ldots$. For each component $B_1$, we then associate to it a 2D interval $(r_{min}R_j, r_{max}R_j)$ for all j satisfying $\theta_j\in B_1$ as preprocessing.

Figure 17:
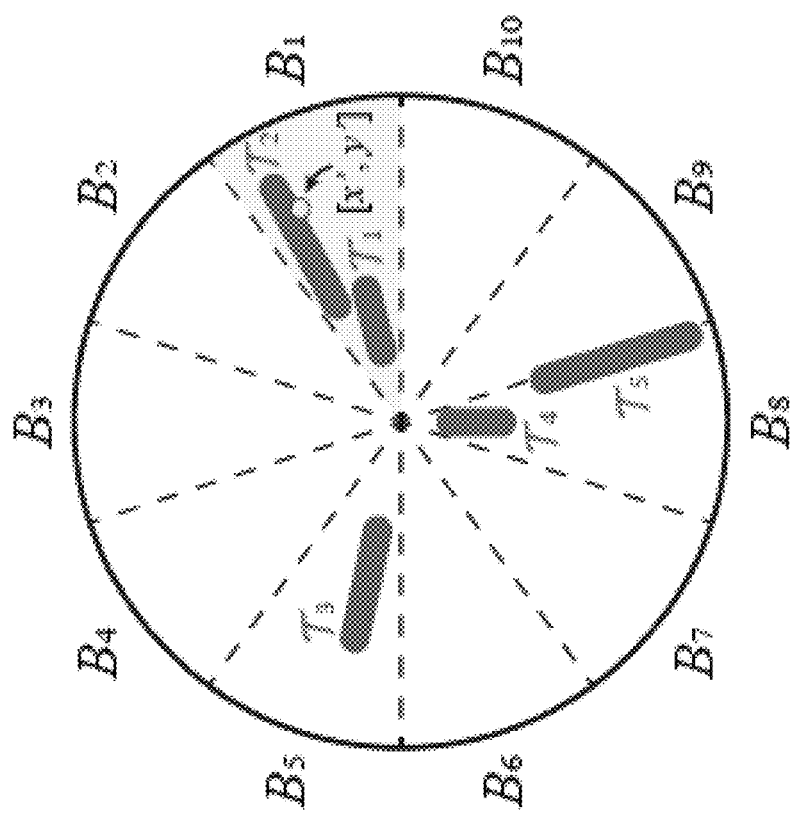
FIG. 17 illustrates the manner in which fiber migration is handled through binning of a cross-section in yarn space in one embodiment.

FIG. 17 illustrates this process for handling fiber migration. As preprocessing, we partition the yarn-space cross-section $A_{yarn}(0)$ into a number of bins $B_1, B_2, \ldots$ based on the azimuthal angle $\theta$. For each bin $B_k$, we store the list of fibers whose trajectories lie close enough to $B_k$. At run-time, given the query point [x', y'], we can quickly find the bin containing this point and obtain the associated fibers. In this example [x', y'] belongs to $B_1$, and $\mathcal{T}_1$ and $\mathcal{T}_2$ are the two fiber trajectories intersecting $B_1$.

In the example illustrated in FIG. 17, for instance, fiber 5 is associated with both $B_8$ and $B_9$. In practice, since each fiber has some non-zero radius $r^{fiber}$, we make each component A to store the list of fibers whose trajectories lie close enough to $B_1$.

As indicated above, at runtime, given [x', y'], we rewrite it in polar coordinates as [r', θ']. Let $B \in \{B_1, B_2, \ldots\}$ be the component containing θ'. We can then retrieve all intervals associated with B that contain r' and examine each of them to see if the corresponding fiber actually covers the given point, as illustrated in FIG. 17.

The full process of an example regular fiber lookup technique is summarized in Algorithm 4 of FIG. 18. Notice that Lines 4-6 realize all fiber j associated with $B_k$ to determine if any of them covers $p^{yarn}$. It is possible to further accelerate this step by introducing acceleration structures over the trajectories $T_j$ (so that those faraway from $p^{yarn}$ can be quickly pruned). However, we find this unnecessary in practice since a fine discretization of θ guarantees each bin $B_k$ to be associated with a small number of trajectories.

Flyaway fiber lookups will now be described in more detail. As mentioned above, flyaway fibers capture naturally arising irregularities and contribute significantly to visual realism. Compared to regular fibers that share many common properties (e.g., pitch and migration period), the flyaway fibers are much more different individually, causing significant challenges for realization-free solutions.

We first focus on loop-type flyaway fibers. As described previously, these loops are created by mutating the regular ones. For each yarn i, assume there are in constituent fibers each with k migration cycles (see part (b) of FIG. 12). Let $\rho^{loop}$ denote the density of loops. Then, the expected number of loops in this yarn is $m^{loop} := \rho^{loop} h$ where h is the length of the yarn center. Since the loops are uniformly chosen among all migration cycles, each cycle has a probability of $p := m^{loop}/(mk)$ to be mutated. Given this probability, we can then easily extend the regular fiber lookup routine to occasionally scale up a fiber's radius (according to randomly sampled $R_{max}^{loop}$). In particular, when realizing a regular fiber j on the fly (Line 5 in Algorithm 4 of FIG. 18), we further determine if the corresponding migration cycle is mutated (see below for more details on how this can be done in a consistent way). If so, we then use a different $R_j$ (given by $R_{max}^{loop}$ from the procedural model) to check if the mutated fiber covers $p^{yarn}$.

With the loop fibers properly handled, we now focus on hair-type flyaway fibers described using Eq. (15). Compared to loop-type fibers, the hair-type ones are even more irregular and challenging to handle in a realization-minimizing way. In particular, unlike regular fibers that are valid for the entirety of $z \in [0, h]$, a hair fiber j is only defined between $z_{j,1}$ and $z_{j,2}$ (see Eq. (15) and part (a) of FIG. 12). It follows that, given $p^{yarn} = [x, y, z]$, every hair fiber j covering $p^{yarn}$ should have $z_{j,1}$ and $z_{j,2}$ with $z \in [z_{j,1} - r^{fiber}, z_{j,2} + r^{fiber}]$. Notice that we extended the interval of $[z_{j,1}, z_{j,2}]$ using the fiber radius $r^{fiber}$ since $p^{yarn}$ with z slightly smaller than $z_{j,1}$ or greater than $z_{j,2}$ can still be within the range of $r^{fiber}$ to the fiber center. Let $\mathcal{J}(z)$ denote the set of hair fibers satisfying this condition:

$$\mathcal{J}(z) := \{j | z \in [z_{j,1} - r^{fiber}, z_{j,2} + r^{fiber}]\}. \quad (24)$$

Then, obtaining $\mathcal{J}(z)$ becomes an important step for looking up any hair-type flyaway fibers at $p^{yarn}$.

We now introduce two complementary solutions to obtain $\mathcal{J}(z)$ at render time. First, we present a purely realization-free solution where no per-fiber information has to be pre-generated or stored. Second, we introduce a solution which stores partial information for each hair fiber but offers significantly superior performance.

The fully realization-free solution is as follows. According to Eq. (24), each j in $\mathcal{J}(z)$ should satisfy $z \geq z_{j,1} - r^{fiber}$ and $z \leq z_{j,2} + r^{fiber}$. In other words, $z_{j,1} \leq z + r^{fiber}$ and $z_{j,2} \geq z - r^{fiber}$. Thus, by embedding each hair fiber j into a 2D Euclidean space at $z_j := (z_{j,1}, z_{j,2})$, we know that $$z_j \in D(z) \text{ where } D(z) := [0, z + r^{fiber}] \times [z - r^{fiber}, h].$$

Computing $\mathcal{J}(z)$ then becomes finding all hairs embedded within the rectangle D(z). Since $z_{j,1}$ and $z_{j,2}$ for all j are independent and identically distributed, one can leverage the framework introduced by W. Jakob et al., "Discrete stochastic microfacet models," ACM Trans. Graph. 33(4), 115:1-115:10, 2014, which is incorporated by reference herein, to obtain all $z_j$ in D(z) in the manner described below.

The basic idea is to traverse an (implicit) point hierarchy in which each node corresponds to an axis-aligned bounding box. At a node corresponding to $\Omega \subset \mathbb{R}^2$ in which a set of n hair fibers are embedded, one can split $\Omega$ into four equal sized sub-domains $\Omega_1, \Omega_2, \Omega_3, \Omega_4$. According to the procedural model, the probability $p_k$ for a fiber to be further contained in $\Omega_k$ can be evaluated for k=1, ..., 4. Then, by sampling a multinomial distribution, the number $n_k$ for fibers belonging to $\Omega_k$ can be obtained, which then allows this process to be recursively applied for each $\Omega_k$ and $n_k$ until reaching a leaf with n≤1. We summarize this entire process in Algorithm 5 of FIG. 19. Notice that if we seed the random number generator used by each node consistently, the outcome of Algorithm 5 will be fixed for any given z, I, and $\Omega$. More details on consistently seeded random number generation are provided elsewhere herein. Lastly, we have $\mathcal{J}(z) = \text{ActiveFibers}(z, \{1, 2, \ldots, m\}, [0, h]^2)$ where in indicates the total number of hair fibers in the current yarn.

Although the fully realization-free solution requires no pre-stored information, several steps of Algorithm 5, such as sampling multinomial distributions, are computationally expensive. Thus, we present an alternative solution providing a good balance between performance and memory consumption. We use this solution to generate the experimental realization-minimizing rendering results referred to herein.

In particular, we pre-generate the Z coordinates for all hair-type fibers (while leaving the other dimensions realized on demand). Then, to efficiently determine $\mathcal{J}(z)$ for a given yarn, we pre-discretize the Z dimension using $z_{j,1} - r^{fiber}$ and $z_{j,2} - r^{fiber}$ for each constituent hair-type flyaway fiber j, as illustrated in FIG. 20.

Figure 20:
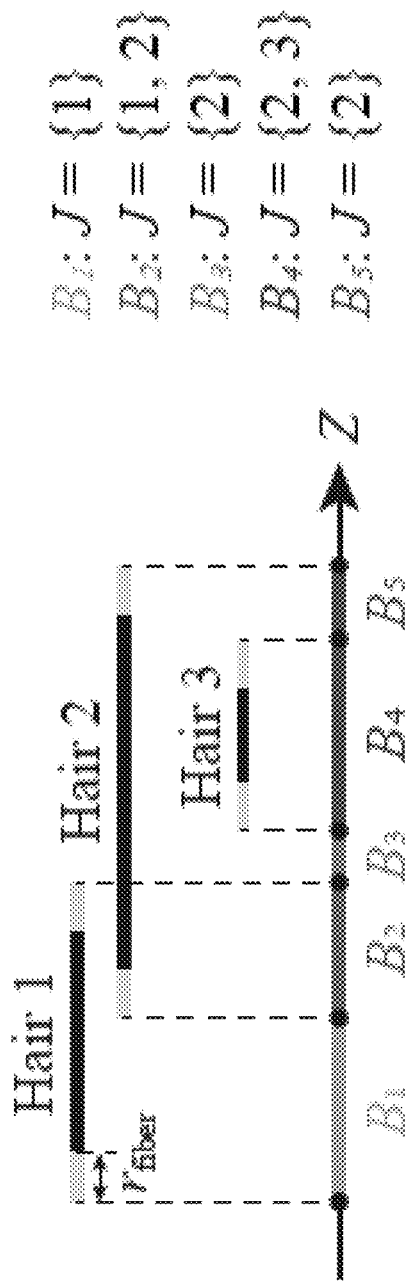
FIG. 20 illustrates a hybrid approach providing an alternative to a fully realization-free implementation in one embodiment.

FIG. 20 more particularly shows discretizing the Z dimension based on the two endpoints (i.e., $z_{j,1} - r^{fiber}$ and $z_{j,2} + r^{fiber}$) of each hair-type fiber j. In this example, there are three hair-type fibers that yield a discretization of five bins $B_1, B_2, \ldots, B_5$. The set of active fibers $\mathcal{J}$ remains constant in each bin.

For each bin with endpoints and $z_\downarrow$ and $z_\uparrow$, we further store a list indicating active hair fibers (i.e., all j with $z_{j,1} \leq z_\downarrow$ and $z_{j,2} \geq z_\uparrow$). At runtime, we can then quickly select the bin containing z using binary search, which in turn gives $\mathcal{J}(z)$.

When $\mathcal{J}(z)$ is determined (using either the full or the hybrid approach), we then realize other parameters used in Eq. (15) for each active hair fiber using consistently seeded random number generators. Lastly, we check if any of them indeed covers $p^{yarn}$.

Illustrative embodiments described above use dimension Z to reason about fiber activeness via Eq. (24). In principle, since hair-type flyaway fibers can also be parameterized using R and θ, each of these dimensions (or even a combination of multiple of them) can be used to define the set $\mathcal{J}$ of active fibers. We choose Z as the "main" dimension because the hair fibers are generally short and sparsely distributed in this dimension. In fact, according to experiments, a realization-minimizing solution in some embodiments is even faster than the fully realized version where all hair fibers are pre-generated and looked up using a Kd-tree at run-time. This is because although the realization-minimizing solution may have to examine more candidate fibers, the fact that each discretized bin only contains a small number of active fibers makes the overhead of the approach lower than that introduced by the Kd-tree traversals.

Up to this point, we have assumed that Eq. (12), (13), and (14) describe fibers in entire yarns. In case of multi-ply yarns, however, these equations actually capture fibers in individual plies which in turn are twisted to form yarns. We did not describe this further rendering complexity earlier for ease of explanation, but the disclosed rendering techniques can be easily extended to handle textiles with multi-ply yarns. Given a point $p^{yarn}=[x, y, z]$ in the yarn space, one can further transform it to $p_{ply}$ in the ply space by finding the cross-sectional ply center closest to [x, y]. The resulting $p_{ply}$ can then be fed into the following steps of the approach for regular and flyaway lookups.

We now describe implementation specifics that complete the description of the illustrative embodiments. First, we describe the formulation of yarn curves and how the normal and binormal used by Eq. (18) are obtained. Then, we describe how to efficiently find the closest point on a set of yarn curves from any given point, which is used by the yarn lookup step. Lastly, we discuss how random numbers can be generated in a consistent way, an important ingredient for flyaway lookups.

With regard to yarn curve representation, to ensure that t and n indeed provide smoothly rotating local frames, we describe the input curve $\alpha$ using cubic Hermite splines with $\mathcal{C}^1$ smoothness. Although other embodiments represent yarn and fiber curves using piecewise linear polylines, we have found that polylines offer only $\mathcal{C}^0$ continuity, and in some cases may have artifacts in final renderings.

It should be noted that Eq. (18) requires the normal direction n to be specified everywhere on the curve $\alpha$ such that $\langle n(z), t(z) \rangle = 0$ for all t. One simple solution is setting $$n(z) = \left(\frac{d}{dt}t\right)(z) = \left(\frac{d^2}{dt^2}\alpha\right)(z).$$

This, unfortunately, has several drawbacks: first, $$\left(\frac{d}{dt}t\right)(z)$$

vanishes at locally straight (i.e., zero-curvature) regions; second, it can change rapidly (or even to its opposite) when transitioning from positively to negatively curved areas. These drawbacks can lead to unsatisfactory rendered results. We, therefore, determine n using rotation minimizing frames (RMF). In particular, we obtain n with the rotation-based RMF introduced by J. Bloomenthal et al., "Calculation of reference frames along a space curve," Graphics gems 1, pp. 567-571, 1990, which is incorporated by reference herein.

The yarn lookup step described above is configured to find all relevant yarns, as well as to project the given fabric-space point p onto each of them. Since the projection is quite expensive computationally, we prune the yarn curves as much as possible beforehand by leveraging nearest-neighbor (NN) searches on all vertices (i.e., endpoints of all spline segments) of the input yarn curves. Specifically, we create a point Kd-tree storing all these vertices during preprocessing. This point Kd-tree has to be rebuilt whenever the yarn curves deform, which needs to be performed per-frame for animated scenes. Fortunately, the computational overhead for building this Kd-tree is negligible compared to rendering a full image.

At render time, given p, we query the Kd-tree for all points within a certain radius $R^{query}$ around p. The yarns corresponding to the outcome of this search are then considered relevant and used for projection computations.

Figure 21:
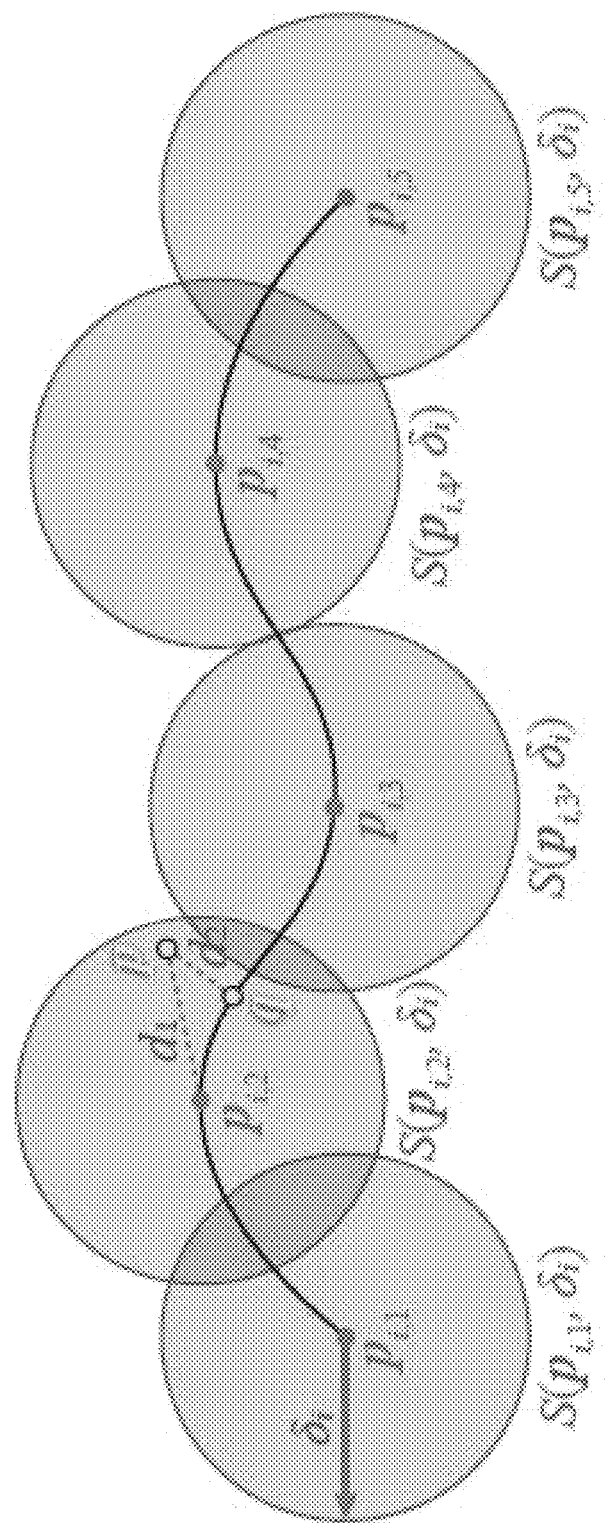
FIG. 21 illustrates bounding of distance between point-to-vertex and point-to-curve distances of a yarn curve in one embodiment.

We determine $R^{query}$ in the following manner. We do not simply set $R^{query}$ to the (maximal) yarn radius because the minimal distance from p to a control point is generally greater than that to the actual splines, as illustrated in FIG. 21. Thus, we enlarge the lookup radius so that we conservatively find all yarns that might contain p.

For each yarn i with vertices $p_{i,1}$, $p_{i,2}$, ..., given p, let $d_1$ and $d_2$ respectively denote the minimal distances from p to the vertices and to the yarn curve $\alpha_i$. Namely, $$d_1(p) := \min_k \|p - p_{i,k}\|,$$

$$d_2(p) := \min_t \|p - \alpha_i(t)\|.$$

Then, if we can estimate an upper bound $\delta_i$ of $d_1(p) - d_2(p)$ for any p, the NN search radius $R^{query}$ can then be set to $R_i^{yarn} + \delta_i$.

FIG. 21 more particularly illustrates the upper bound of the difference between point-to-vertex and point-to-curve distances. When the union of spheres $S(p_{i,k}, \delta_i)$ fully covers the yarn curve $\alpha_i$, for any p, the difference between point-to-vertex distance $d_1(p)$ (i.e., the minimal distance from p to one of the vertices $p_{i,k}$) and point-to-curve distance $d_2(p)$ (i.e., the minimal distance from p to the curve $\alpha_i$) will never exceed $\delta_i$. Namely, $d_1(p) - d_2(p) \leq \delta_i$ for all p.

Accordingly, to obtain $\delta_i$, we consider growing spheres centered at all the vertices $p_{i,1}$, $p_{i,2}$, ... until their union fully covers the curve $\alpha_i$, as illustrated in FIG. 21. Concretely, we search for $\delta_i \in \mathbb{R}_+$ such that $\alpha_i \subset \cup_k S(p_{i,k}, \delta_i)$, where $S(p_{i,k}, \delta_i)$ denotes the sphere centered at $p_{i,k}$ with radius $\delta_i$. This can be done by examining each spline segment k, computing its bounding box using the two endpoints $p_{i,k}$, $p_{i,k+1}$ and associated tangents, and ensuring that this box is contained in $S(p_{i,k}, \delta_i) \cup S(p_{i,k+1}, \delta_i)$.

Lastly, for each relevant yarn i, we compute the projection q of p onto its center curve $\alpha_i$. This involves solving a piece-wise quintic equation, and we utilize an efficient implementation offered by the Spline Library for this purpose.

The flyaway lookup process described above is configured to generate random numbers in consistent ways. For instance, when handling loop-type fibers, we randomly select fiber migration cycles in each yarn and mutate them. To ensure the same set of cycles are always chosen for a given yarn i, one possibility is to reseed the random number generator using i (or some pre-determined function of i) before the random selection starts. We, however, noted that such reseeding can be expensive in practice. Instead, we use quasi Monte Carlo (QMC) sequences, the van der Corput sequence in particular, indexed using the yarn and fiber indices. For instance, if accessing each yarn requires N random numbers, we associate elements with indices N(i−1)+1, N(i−1)+2, ..., N·i in the QMC sequence to yarn i.

In principle, the random numbers should be independent, which is not strictly the case for QMC sequences. Fortunately, we observed no visual artifact caused by correlated samples. Further, this correlation can be reduced by taking every n-th sample from the QMC sequence by simply multiplying all indices by n (for some constant n), which is a common practice used by Markov-Chain Monte Carlo methods to generate near-independent samples. It should be understood that numerous other techniques for consistent generation of random numbers can be used in other embodiments.

We implemented an illustrative embodiment of the above-described procedural yarn model as a specialized volume allowing the query of material density and orientation information at individual 3D locations. This volume then defines an anisotropic medium that can be rendered using standard Monte Carlo methods. We generated all realization-minimizing experimental results using volume path tracing where the free distance between consecutive scattering events are sampled using delta tracking. Notice that technique in this embodiment is orthogonal to the choice of the phase function. In practice, we used the micro-flake phase function, although other phase functions could be used.

We have demonstrated the effectiveness of illustrative techniques through experimental results. In experiments on moderate sized models, we found that an illustrative embodiment of the method runs at approximately the same speed as a reference solution where all fiber curves are fully realized, and stored in a Kd-tree (in preprocess) for render-time volumetric lookups. For example, rendering a scene with 100 yarns and 29,800 fibers using the reference solution takes 15.8 seconds at one million pixel resolution and one sample per pixel, while the method in the illustrative embodiment takes 15.0 seconds. The additional computation in the illustrative embodiment does not make that technique slower than the reference solution because it exploits the mathematical structure of the procedural models, and mostly works in lower-dimensional domains (e.g., yarn cross-sections). This introduces lower overhead compared to the reference solution which works purely in 3D.

Other reference solutions are possible, including using fully voxelized volumes and fiber meshes. However, full voxelization is impractical even for moderate sized models (without instancing). Fiber meshes are not volumetric, and thus are so different that making an apples-to-apples comparison to these methods is not easy.

Illustrative embodiments provide improvements over conventional techniques such as core-fiber approximation and structure-aware synthesis.

For example, the former technique has difficulties handling general fiber migrations, and its use of displacement mapping has difficulty capturing overhang structures resulting from strongly migrated fibers.

The latter technique generates large-scale models based on a small database of example tiles. Beside the inconvenience of requiring many example tiles for variety, there are seams in the synthesized models at the yarn level. This is because adjacent tiles in these models are not guaranteed to be continuous along the boundary. Further, one example tile can appear many times in the resulting model, leading to periodic patterns. Illustrative embodiments do not rely on tiling and are therefore free of these artifacts.

The above-noted realization-minimizing experimental results were generated using a procedural textile model of the type disclosed herein as a customized volumetric data source for a Mitsuba renderer. The experimental results indicate that the system can accurately and efficiently render virtual scenes with large textiles, including complex woven and knitted fabrics with substantial yarn color and/or banding variations, that would be very difficult (if not impossible) to render if fully realized.

As indicated previously, illustrative embodiments provide new algorithms and data structures to look up both regular and flyaway fibers on the fly while storing only a fraction of full model realizations. Such embodiments enable physically based rendering of large virtual textiles that have previously been very difficult, if not impossible, to render. As a result, these embodiments are able to more fully exploit the power of procedural models in rendering images of complex textiles.

It is to be appreciated that the various embodiments disclosed herein are presented by way of illustrative example only, and should not be construed as limiting in any way. Numerous alternative arrangements for implementing parameter fitting for procedural yarn models and associated procedural yarn generation algorithms for image rendering can be utilized in other embodiments.

Accordingly, the embodiments described above are considered illustrative only, and should not be viewed as limited to any particular arrangement of features. For example, those skilled in the art will recognize that alternative processing operations and associated system entity configurations can be used in other embodiments. It is therefore possible that other embodiments may include additional or alternative system entities, relative to the entities of the illustrative embodiments. Also, the particular parameter fitting pipeline stages, process operations, procedural yarn model parameters, procedural yarn generation algorithms and other aspects of the illustrative embodiments can be varied in other embodiments.

It should also be noted that the above-described information processing system arrangements are exemplary only, and alternative system arrangements can be used in other embodiments.

A given client, server, processor or other component in an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, an ASIC, an FPGA, a CPU, an ALU, a DSP, or other similar processing device component, as well as other types and arrangements of processing circuitry, in any combination. For example, a given parameter fitting pipeline module of a processing device as disclosed herein can be implemented using such circuitry.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, ROM, magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with procedural yarn model parameter fitting and procedural yarn generation as well as other related functionality.

Processing devices in a given embodiment can include, for example, computers, servers and/or other types of devices each comprising at least one processor coupled to a memory, in any combination. For example, one or more computers, servers, storage devices or other processing devices can be configured to implement at least portions of a parameter fitting pipeline and/or an image rendering system as disclosed herein. Communications between the various elements of an information processing system comprising processing devices associated with respective system entities may take place over one or more networks.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. Each processing device of the processing platform is assumed to comprise a processor coupled to a memory.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure in place of or in addition to virtualization infrastructure comprising virtual machines. Thus, it is possible in some embodiments that system components can run at least in part in cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components of the system as disclosed herein can be implemented at least in part in the form of one or more software programs stored in memory and executed by a processor of a processing device. For example, certain functionality associated with parameter fitting and procedural yarn generation components of a system can be implemented at least in part in the form of software.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts.

It is also to be appreciated that the particular process steps used in the embodiments described above are exemplary only, and other embodiments can utilize different types and arrangements of processing operations. For example, certain process steps shown as being performed serially in the illustrative embodiments can in other embodiments be performed at least in part in parallel with one another.

It should again be emphasized that the embodiments of the invention as described herein are intended to be illustrative only. Other embodiments of the invention can be implemented utilizing a wide variety of different types and arrangements of information processing systems, processing platforms, parameter fitting pipelines, pipeline stages, procedural yarn models, model parameters, image rendering systems and procedural yarn generation algorithms than those utilized in the particular illustrative embodiments described herein. In addition, the particular assumptions made herein in the context of describing certain embodiments need not apply in other embodiments. These and numerous other alternative embodiments will be readily apparent to those skilled in the art.

What is claimed is:

1. An apparatus for model-based generation of one or more images, comprising:
 a multi-stage processing pipeline configured to generate a procedural yarn model by fitting procedural yarn model parameters to input data comprising computed tomography measurements of one or more actual yarn samples; and
 an image rendering system configured to execute one or more procedural yarn generation algorithms utilizing the procedural yarn model and to generate based at least in part on results of execution of the one or more procedural yarn generation algorithms at least one corresponding output image for presentation on a display;
 the multi-stage processing pipeline comprising:
 a first stage configured to perform ply twisting estimation and ply cross-sectional estimation on at least a portion of the input data corresponding to a given yarn sample having multiple twisted plies with each such ply comprising multiple fibers;

a second stage configured to classify constituent fibers of each of the plies of the given yarn sample characterized by the input data into regular fibers of the input data and flyaway fibers of the input data;

a third stage configured to process the regular fibers; and a fourth stage configured to process the flyaway fibers;

wherein the third and fourth stages fit different sets of parameters of the procedural yarn model using the respective regular and flyaway fibers;

the multi-stage processing pipeline and the image rendering system being implemented on at least one processing device comprising a processor coupled to a memory.

2. The apparatus of claim 1 wherein the input data is generated by a micro computed tomography scanner and comprises volumetric density information for each of multiple scanned yarn samples.

3. The apparatus of claim 1 wherein the input data for the given yarn sample is preprocessed prior to application to the multi-stage processing pipeline in order to generate extracted fiber curves and a plurality of tracked ply centers.

4. The apparatus of claim 1 wherein the first stage of the multi-stage processing pipeline is configured to fit additional parameters of the procedural yarn model to the input data and wherein the additional parameters comprise ply twisting parameters, ply cross-section parameters and per-ply fiber count.

5. The apparatus of claim 4 wherein the first stage of the multi-stage processing pipeline is further configured to utilize the additional parameters fit to the input data in that stage to adjust component plies of the given yarn sample so that all of the plies are centered on a common axis and have common cross-sectional shapes.

6. The apparatus of claim 4 wherein the ply twisting parameters are fit to the input data in the first stage of the multi-stage processing pipeline by computing a circularly helical curve for each of the plies as a function of a common ply radius shared by all the plies, a common ply pitch shared by all the plies, and a ply initial angle of a first one of the plies which is utilized to compute initial ply angles for other ones of the plies.

7. The apparatus of claim 6 wherein the common ply radius, the common ply pitch and the ply initial angle of a first one of the plies are determined by minimizing distance between a given one of the circularly helical curves and a corresponding one of a plurality of tracked ply centers of the input data.

8. The apparatus of claim 4 wherein the ply cross-section parameters are fit to the input data in the first stage of the multi-stage processing pipeline by:

for each of a plurality of cross-sectional planes, placing an ellipse at a center of each ply within that plane with a short axis of the ellipse pointing towards a center of a polygon formed by all of the ply centers and then transforming each ply in the plane to make it axis-aligned and centered at a common origin;

combining the transformed plies from each of the plurality of cross-sectional planes to obtain an accumulated two-dimensional point cloud; and computing separate ply cross-section parameters for x and y dimensions as a function of respective standard deviations of x and y coordinates of points in the point cloud.

9. The apparatus of claim 1 wherein the second stage of the multi-stage processing pipeline is configured to classify constituent fibers of each of the plies into regular fibers and flyaway fibers by:

determining for each of a plurality of fibers a minimal and maximal distance of that fiber from its corresponding ply center;

eliminating any fibers having minimal distances above a first threshold; and for any remaining fibers, classifying those fibers with maximal distances at or below a second threshold as regular fibers and those with maximal distances above the second threshold as flyaway fibers.

10. The apparatus of claim 1 wherein the parameters of the procedural yarn model that are fit utilizing regular fibers of the input data in the third stage of the multi-stage processing pipeline comprise cross-sectional fiber distribution parameters, fiber twisting parameters and fiber migration parameters.

11. The apparatus of claim 10 wherein the fiber migration parameters are determined by minimizing reconstruction error between the regular fibers and respective corresponding generated fibers over all of the regular fibers.

12. The apparatus of claim 11 wherein the cross-sectional fiber distribution parameters are determined from the fiber migration parameters by per-fiber error minimization of at least a subset of the fiber twisting parameters followed by maximum likelihood estimation over results of the per-fiber error minimization.

13. The apparatus of claim 1 wherein the parameters of the procedural yarn model that are fit utilizing flyaway fibers of the input data in the fourth stage of the multi-stage processing pipeline comprise flyaway fiber distribution parameters of a flyaway fiber model.

14. The apparatus of claim 13 wherein the flyaway fiber model characterizes the flyaway fibers as comprising loop-type flyaway fibers and hair-type flyaway fibers.

15. The apparatus of claim 14 wherein the flyaway fiber distribution parameters for a given one of the loop-type fibers comprises a radius scaling parameter for application to selected vertices characterizing respective distances to a ply center and a loop-type fiber density parameter that controls a number of applications of the radius scaling parameter.

16. The apparatus of claim 14 wherein the flyaway fiber distribution parameters for a given one of the hair-type fibers comprises starting and ending radii parameters characterizing respective distances to a ply center, corresponding azimuthal angles and locations that in combination with the starting and ending radii parameters specify an arc shape, and a hair-type fiber density parameter that controls a number of arc shapes to be generated.

17. The apparatus of claim 14 wherein at least one of the flyaway fibers contains both loop-type and hair-type components and is separated into corresponding respective segments for determination of the flyaway fiber distribution parameters.

18. The apparatus of claim 1 wherein at least the third and fourth stages of the multi-stage processing pipeline are configured to operate at least in part in parallel with one another.

19. The apparatus of claim 1 wherein a given one of the one or more procedural yarn generation algorithms utilizing the procedural yarn model comprises a realization-reducing procedural yarn generation algorithm which is configured to determine local material density and direction information for each of a plurality of fabric-space points in generating a particular procedural yarn.

20. The apparatus of claim 19 wherein input to the realization-reducing procedural yarn generation algorithm comprises one or more yarn curves and for each such yarn curve a corresponding set of parameter values for the procedural yarn model.

21. The apparatus of claim 19 wherein the realization-reducing procedural yarn generation algorithm determines local material density and direction information for each of a plurality of fabric-space points by:
  determining for a given one of the points a yarn curve to which the point belongs;
  transforming the point from fabric space to yarn space for the determined yarn curve; and
  determining if the point is covered by a regular fiber in yarn space.

22. The apparatus of claim 21 wherein the realization-reducing procedural yarn generation algorithm further comprises:
  partitioning a yarn space cross-section into a plurality of bins; and
  for each bin, storing a list of fibers having respective trajectories that are within a threshold closeness to that bin.

23. The apparatus of claim 21 wherein the realization-reducing procedural yarn generation algorithm further comprises:
  randomly scaling up a fiber radius when realizing a given regular fiber to produce a corresponding loop-type flyaway fiber; and
  determining if the point is covered by the loop-type flyaway fiber.

24. The apparatus of claim 21 wherein the realization-reducing procedural yarn generation algorithm further comprises:
  determining intervals in each of one or more dimensions for a plurality of hair-type flyaway fibers; and
  determining if the point falls within the intervals.

25. The apparatus of claim 1 wherein the image rendering system comprises at least one of a computer graphics generation system and a textile simulation tool.

26. A method for model-based generation of one or more images, comprising:
  configuring a multi-stage processing pipeline to generate a procedural yarn model by fitting procedural yarn model parameters to input data comprising computed tomography measurements of one or more actual yarn samples;
  executing one or more procedural yarn generation algorithms utilizing the procedural yarn model; and
  generating based at least in part on results of execution of the one or more procedural yarn generation algorithms at least one corresponding output image for presentation on a display;
  the multi-stage processing pipeline comprising:
  a first stage configured to perform ply twisting estimation and ply cross-sectional estimation on at least a portion of the input data corresponding to a given yarn sample having multiple twisted plies with each such ply comprising multiple fibers;
  a second stage configured to classify constituent fibers of each of the plies of the given yarn sample characterized by the input data into regular fibers of the input data and flyaway fibers of the input data;
  a third stage configured to process the regular fibers; and
  a fourth stage configured to process the flyaway fibers;
  wherein the third and fourth stages fit different sets of parameters of the procedural yarn model using the respective regular and flyaway fibers; and
  wherein the method is performed by at least one processing device comprising a processor coupled to a memory.

27. The method of claim 26 wherein the parameters of the procedural yarn model that are fit utilizing regular fibers of the input data in the third stage of the multi-stage processing pipeline comprise cross-sectional fiber distribution parameters, fiber twisting parameters and fiber migration parameters.

28. The method of claim 26 wherein the parameters of the procedural yarn model that are fit utilizing flyaway fibers of the input data in the fourth stage of the multi-stage processing pipeline comprise flyaway fiber distribution parameters of a flyaway fiber model wherein the flyaway fiber model characterizes the flyaway fibers as comprising loop-type flyaway fibers and hair-type flyaway fibers.

29. The method of claim 26 wherein a given one of the one or more procedural yarn generation algorithms utilizing the procedural yarn model comprises a realization-reducing procedural yarn generation algorithm which is configured to determine local material density and direction information for each of a plurality of fabric-space points in generating a particular procedural yarn.

30. The method of claim 26 wherein input to the realization-reducing procedural yarn generation algorithm comprises one or more yarn curves and for each such yarn curve a corresponding set of parameter values for the procedural yarn model.

31. A computer program product for model-based generation of one or more images, comprising a non-transitory processor-readable storage medium having stored therein program code of one or more software programs, wherein the program code when executed by at least one processing device causes said at least one processing device:
  to configure a multi-stage processing pipeline to generate a procedural yarn model by fitting procedural yarn model parameters to input data comprising computed tomography measurements of one or more actual yarn samples;
  to execute one or more procedural yarn generation algorithms utilizing the procedural yarn model; and
  to generate based at least in part on results of execution of the one or more procedural yarn generation algorithms at least one corresponding output image for presentation on a display;
  the multi-stage processing pipeline comprising:
  a first stage configured to perform ply twisting estimation and ply cross-sectional estimation on at least a portion of the input data corresponding to a given yarn sample having multiple twisted plies with each such ply comprising multiple fibers;
  a second stage configured to classify constituent fibers of each of the plies of the given yarn sample characterized by the input data into regular fibers of the input data and flyaway fibers of the input data;
  a third stage configured to process the regular fibers; and
  a fourth stage configured to process the flyaway fibers;
  wherein the third and fourth stages fit different sets of parameters of the procedural yarn model using the respective regular and flyaway fibers.

32. The computer program product of claim 31 wherein the parameters of the procedural yarn model that are fit utilizing regular fibers of the input data in the third stage of the multi-stage processing pipeline comprise cross-sectional fiber distribution parameters, fiber twisting parameters and fiber migration parameters.

33. The computer program product of claim 31 wherein the parameters of the procedural yarn model that are fit utilizing flyaway fibers of the input data in the fourth stage of the multi-stage processing pipeline comprise flyaway fiber distribution parameters of a flyaway fiber model wherein the flyaway fiber model characterizes the flyaway fibers as comprising loop-type flyaway fibers and hair-type flyaway fibers.

34. The computer program product of claim 31 wherein a given one of the one or more procedural yarn generation algorithms utilizing the procedural yarn model comprises a realization-reducing procedural yarn generation algorithm which is configured to determine local material density and direction information for each of a plurality of fabric-space points in generating a particular procedural yarn.

35. The computer program product of claim 31 wherein input to the realization-reducing procedural yarn generation algorithm comprises one or more yarn curves and for each such yarn curve a corresponding set of parameter values for the procedural yarn model.

\* \* \* \* \*

UNITED STATES PATENT AND TRADEMARK OFFICE
CERTIFICATE OF CORRECTION

PATENT NO. : 10,410,380 B2
APPLICATION NO. : 15/636213
DATED : September 10, 2019
INVENTOR(S) : Kavita Bala et al.

It is certified that error appears in the above-identified patent and that said Letters Patent is hereby corrected as shown below:

In the Specification

Column 1, Line 16-17, please delete "U.S. Pat. No. 1,513,967" and insert therefor --IIS 1513967--

Column 7, Line 20, please delete the equation: "$p(R)=(1-2\in)(e-e^R/e-1)^\beta+\in,$" and insert therefor the equation: --$p(R) = (1-2\epsilon)\left(\dfrac{e-e^R}{e-1}\right)^\beta + \epsilon,$ --

Column 7, Line 36, please delete "a tan 2" and insert therefor --atan2--

Column 7, Line 36, please delete "and a is" and insert therefor --and $\alpha$ is--

Column 12, Line 31, please delete "∈" and insert therefor --$\epsilon$--

Column 12, Line 37, please delete the equation: "$p^{MLE}(R)=2Rp(R)=2R\left[(1-2\epsilon)\left(\dfrac{e-e^R}{e-1}\right)+\epsilon\right].$" and insert therefor the equation: --$p^{MLE}(R) = 2Rp(R) = 2R\left[(1-2\epsilon)\left(\dfrac{e-e^R}{e-1}\right)^\beta + \epsilon\right].$--

Column 12, Line 42, please delete "∈" and insert therefor --$\epsilon$--

Column 12, Line 43, please delete "∈" and insert therefor --$\epsilon$--

Column 12, Line 44, please delete "∈" and insert therefor --$\epsilon$--

Signed and Sealed this
Nineteenth Day of November, 2019

Andrei Iancu
*Director of the United States Patent and Trademark Office*

CERTIFICATE OF CORRECTION (continued)
U.S. Pat. No. 10,410,380 B2

Column 12, Line 45, please delete "∈" and insert therefor --$\epsilon$--

Column 18, Line 15, please delete the equation: "$p(R):=(1-2\varepsilon)\left(\frac{e-e^R}{e-1}\right)+\varepsilon.$" and insert therefor the equation: --$p(R):=(1-2\varepsilon)\left(\frac{e-e^R}{e-1}\right)^{\beta}+\varepsilon.$--

Column 23, Line 29, please delete "in" and insert therefor --m--

Column 24, Line 31, please delete "in" and insert therefor --m--